United States Patent
Zhu et al.

(10) Patent No.: US 9,239,490 B2
(45) Date of Patent: Jan. 19, 2016

(54) DISPLAYS WITH REFLECTIVE POLARIZERS

(71) Applicant: Apple Inc., Cupertino, CA (US)

(72) Inventors: Xinyu Zhu, Cupertino, CA (US); Jun Qi, Cupertino, CA (US); Meizi Jiao, Cupertino, CA (US); Nicholas G. Roland, San Jose, CA (US); Victor H. Yin, Cupertino, CA (US); Wei Chen, Palo Alto, CA (US)

(73) Assignee: Apple, Inc., Cupertino, CA (US)

( * ) Notice: Subject to any disclaimer, the term of this patent is extended or adjusted under 35 U.S.C. 154(b) by 145 days.

(21) Appl. No.: 13/935,110

(22) Filed: Jul. 3, 2013

(65) Prior Publication Data

US 2015/0009451 A1   Jan. 8, 2015

Related U.S. Application Data

(60) Provisional application No. 61/701,544, filed on Sep. 14, 2012.

(51) Int. Cl.
*G02F 1/13363* (2006.01)
*G02F 1/1335* (2006.01)

(52) U.S. Cl.
CPC ...... *G02F 1/13363* (2013.01); *G02F 1/133536* (2013.01)

(58) Field of Classification Search
CPC .................. G02F 1/13363; G02F 1/133536
USPC ......... 349/64, 96, 87; 362/623, 362; 359/487, 359/494
See application file for complete search history.

(56) References Cited

U.S. PATENT DOCUMENTS

| | | | |
|---|---|---|---|
| 5,751,388 A * | 5/1998 | Larson | 349/96 |
| 5,828,488 A * | 10/1998 | Ouderkirk et al. | 359/485.02 |
| 7,006,173 B1 | 2/2006 | Hiyama et al. | |
| 7,057,681 B2 | 6/2006 | Hinata et al. | |
| 7,633,678 B2 | 12/2009 | Takahashi et al. | |
| 2005/0024558 A1* | 2/2005 | Toyooka | 349/112 |
| 2006/0056166 A1* | 3/2006 | Yeo et al. | 362/19 |
| 2006/0105117 A1* | 5/2006 | Kim et al. | 428/1.1 |
| 2006/0285359 A1* | 12/2006 | Yang et al. | 362/615 |
| 2006/0290253 A1* | 12/2006 | Yeo | G02B 5/0226 313/116 |
| 2007/0153384 A1* | 7/2007 | Ouderkirk et al. | 359/500 |

(Continued)

FOREIGN PATENT DOCUMENTS

WO   2012099794   7/2012

*Primary Examiner* — Sang V Nguyen
(74) *Attorney, Agent, or Firm* — Treyz Law Group; Joseph F. Guihan

(57) ABSTRACT

An electronic device may be provided with a display mounted in a housing. The display may include a liquid crystal display module and a reflective polarizer having an in-plane optical axis. The display may also include a backlight unit that includes a light source, a light guide element, and a reflector film coupled to a backside of the light guide element. The display may also include a light retardation layer such as a quarter wave film. The quarter wave film may be arranged between the reflective polarizer and the reflector film of the backlight unit. During operation of the display, partially polarized light that is output from a front side of the light guide element may have a first component parallel to the in-plane optical axis and a second component perpendicular to the in-plane optical axis of the reflective polarizer. The second component may be reflected from the reflective polarizer.

12 Claims, 29 Drawing Sheets

(56) References Cited

U.S. PATENT DOCUMENTS

| | | | |
|---|---|---|---|
| 2008/0030656 A1* | 2/2008 | Watson et al. | 349/96 |
| 2008/0316397 A1* | 12/2008 | Polak et al. | 349/97 |
| 2009/0161044 A1* | 6/2009 | Ge | G02F 1/133555 349/98 |
| 2009/0185385 A1* | 7/2009 | Shiau et al. | 362/339 |
| 2010/0302798 A1* | 12/2010 | Papakonstantinou et al. | 362/601 |
| 2011/0273643 A1* | 11/2011 | Arai | G02F 1/133528 349/64 |
| 2012/0200811 A1* | 8/2012 | Sakai | G02F 1/13363 349/102 |
| 2013/0335823 A1* | 12/2013 | Epstein et al. | 359/489.07 |

* cited by examiner

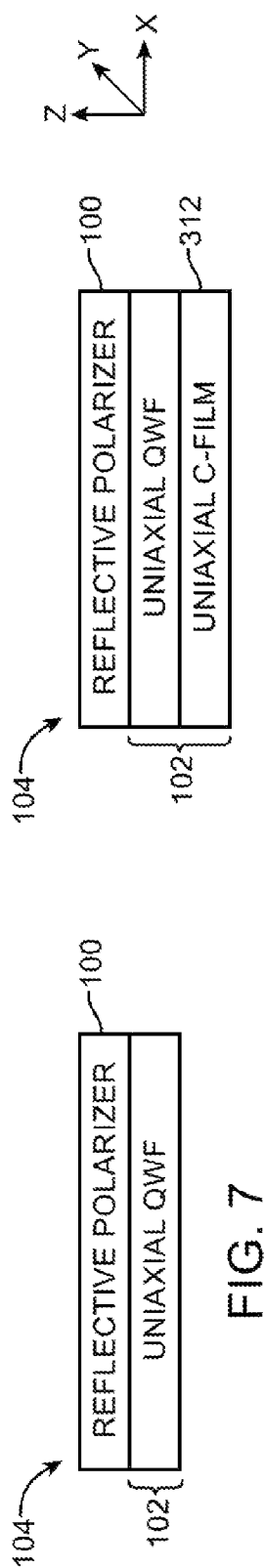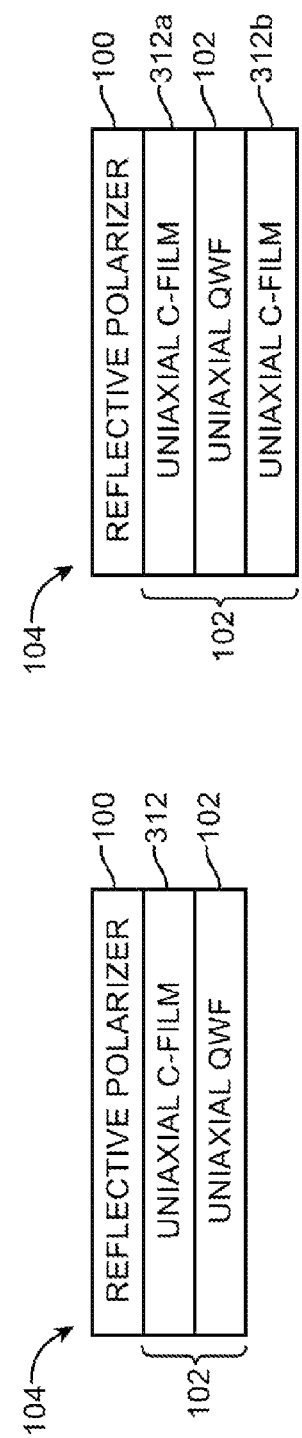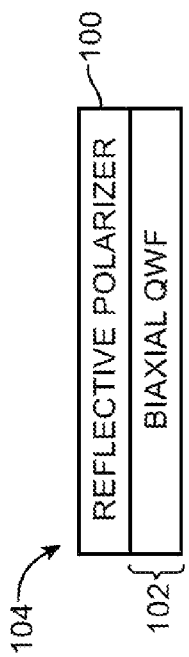

DISPLAYS WITH REFLECTIVE POLARIZERS

BACKGROUND

This relates generally to electronic devices, and more particularly, to electronic devices with displays.

Electronic devices often include displays. For example, cellular telephones and portable computers often include displays for presenting information to a user.

It can be challenging to form displays for electronic devices. Displays such as liquid crystal displays typically include a backlight unit that generates light for the display.

Light is commonly emitted into a light guide plate in the backlight unit and exits the light guide plate into a display module such as a liquid crystal display module. However, if care is not taken, light that exits the light guide plate can sometimes be reflected back toward the light guide plate. This type of reflected light can cause unwanted light leakage from the display, thereby reducing the efficiency of the display.

It would therefore be desirable to be able to provide improved displays for electronic devices.

SUMMARY

An electronic device may be provided with a display mounted within a housing. The display may include a display module such as a liquid crystal display (LCD) panel, a backlight unit, a reflective polarizer, and a light retardation film such as a quarter wave film. The quarter wave film (QWF) may be arranged between a reflector film within the backlight unit (BLU) and the reflective polarizer. The QWF helps improve light recycling efficiency from the reflective polarizer and increase light efficiency into the LCD panel.

The reflective polarizer may be configured to transmit a first polarized light and reflect a second polarized light where the polarization of the second polarized light is orthogonal to the polarization of the first polarized light. The backlight unit may include a light source, a light guide element such as a light guide plate, and a reflector film coupled to a backside of the light guide element. The quarter wave film may be arranged within the backlight unit, among optical films associated with the backlight unit, or between the optical films and the display module such that the quarter wave film is located between the reflector film of the backlight unit and the reflective polarizer.

Further features of the invention, its nature and various advantages will be more apparent from the accompanying drawings and the following detailed description of the preferred embodiments.

BRIEF DESCRIPTION OF THE DRAWINGS

FIG. 7 is a cross-sectional view of an illustrative quarter wave film stack having a uniaxial quarter wave film in accordance with an embodiment of the present invention.

FIG. 8 is a cross-sectional view of an illustrative quarter wave film stack having a uniaxial quarter wave film and a uniaxial c-film in accordance with an embodiment of the present invention.

FIG. 9 is a cross-sectional view of an illustrative quarter wave film stack having a uniaxial quarter wave film and a uniaxial c-film interposed between the uniaxial wave film and the reflective polarizer in accordance with an embodiment of the present invention.

FIG. 10 is a cross-sectional view of an illustrative quarter wave film stack having a uniaxial quarter wave film and multiple uniaxial c-films in accordance with an embodiment of the present invention.

FIG. 11 is a cross-sectional view of an illustrative quarter wave film stack having a biaxial quarter wave film in accordance with an embodiment of the present invention.

DETAILED DESCRIPTION

Electronic devices may include displays. The displays may be used to display images to a user. Illustrative electronic devices that may be provided with displays are shown in FIGS. 1, 2, 3, and 4.

Figure 1:
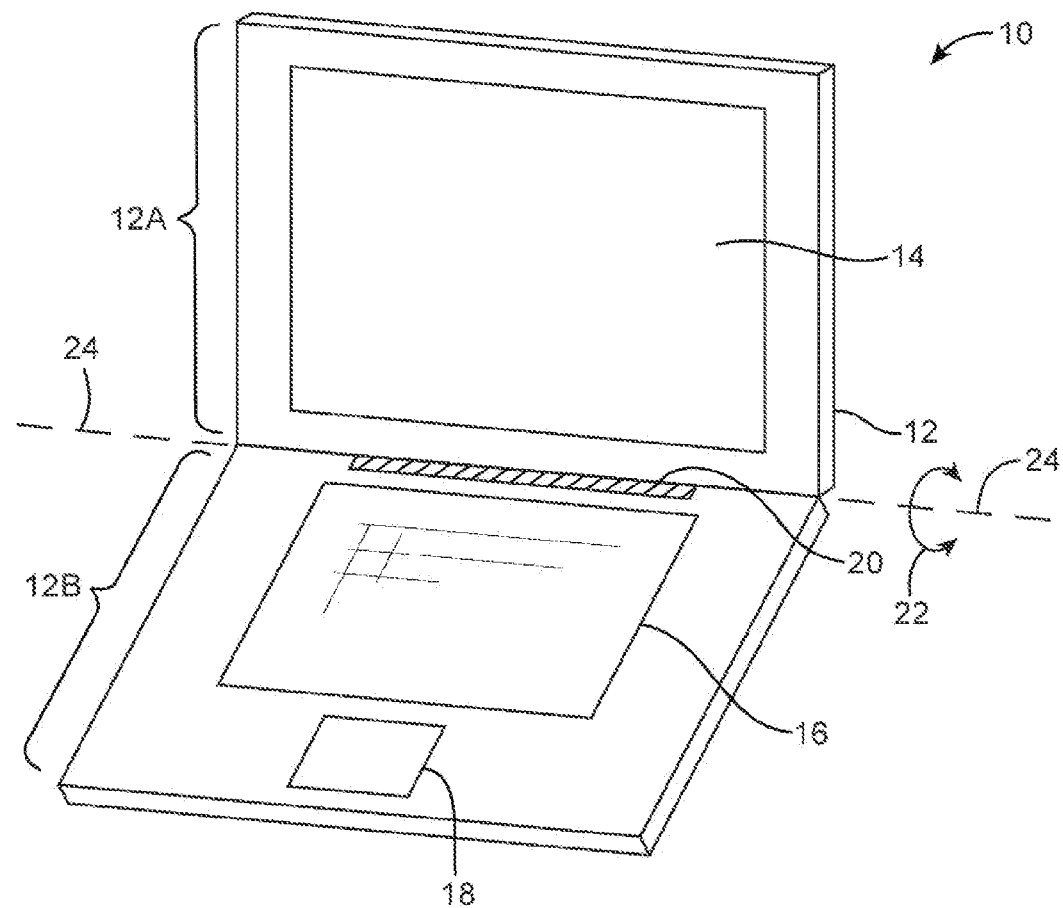
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
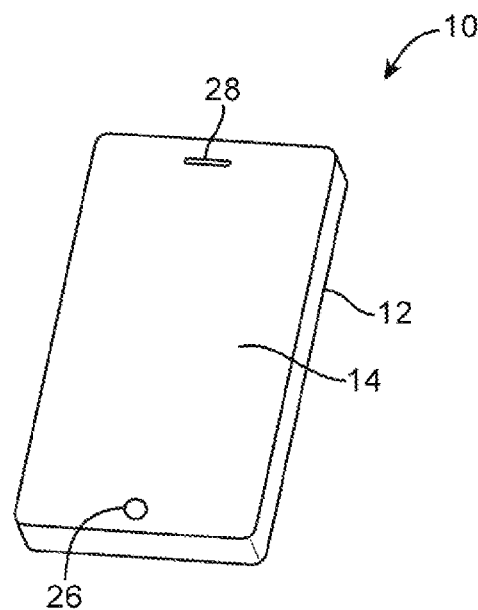
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
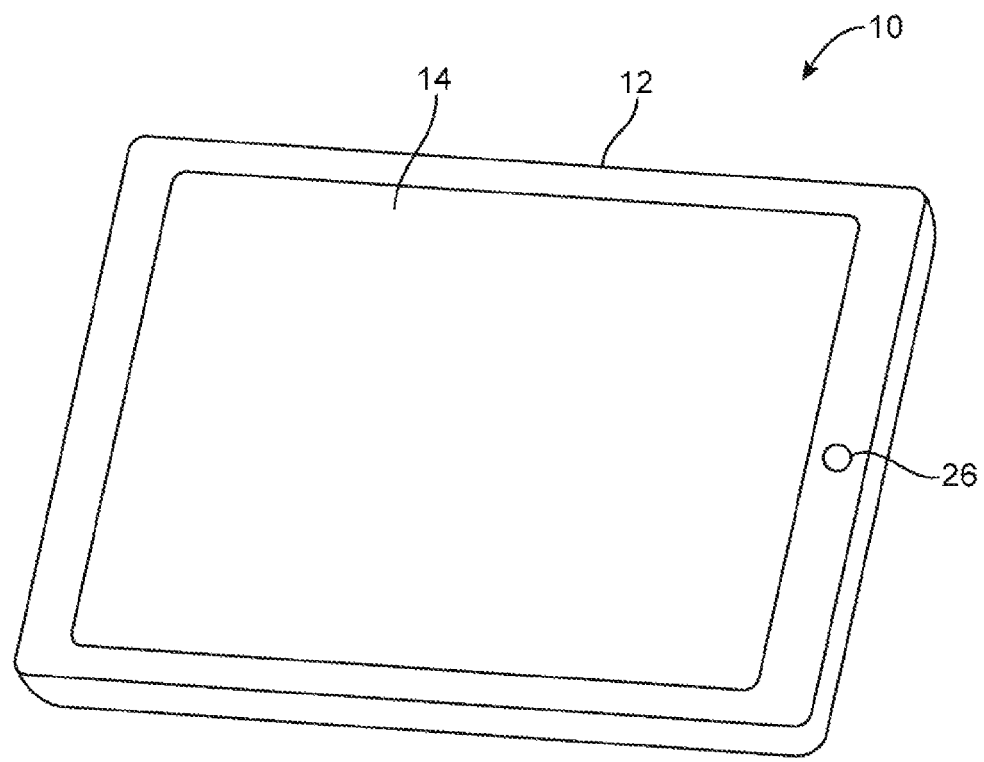
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
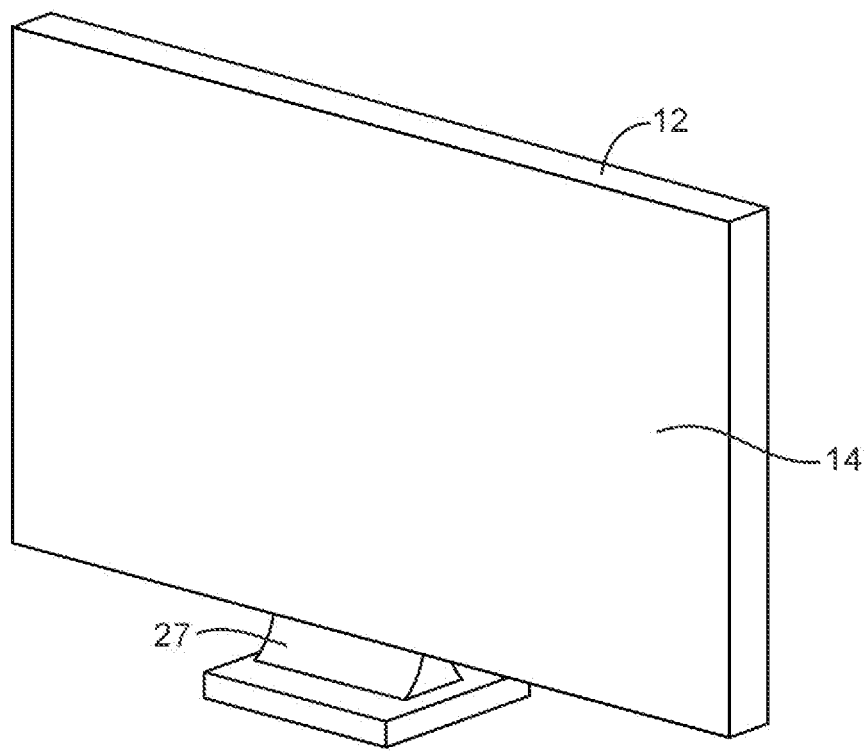
FIG. 4 is a perspective view of an illustrative electronic device such as a computer display with display structures in accordance with an embodiment of the present invention.

FIG. 4 shows how electronic device 10 may be a computer display or a computer that has been integrated into a computer display. With this type of arrangement, housing 12 for device 10 may be mounted on a support structure such as stand 27. Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 includes display pixels formed from liquid crystal display (LCD) components or other suitable image pixel structures.

A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
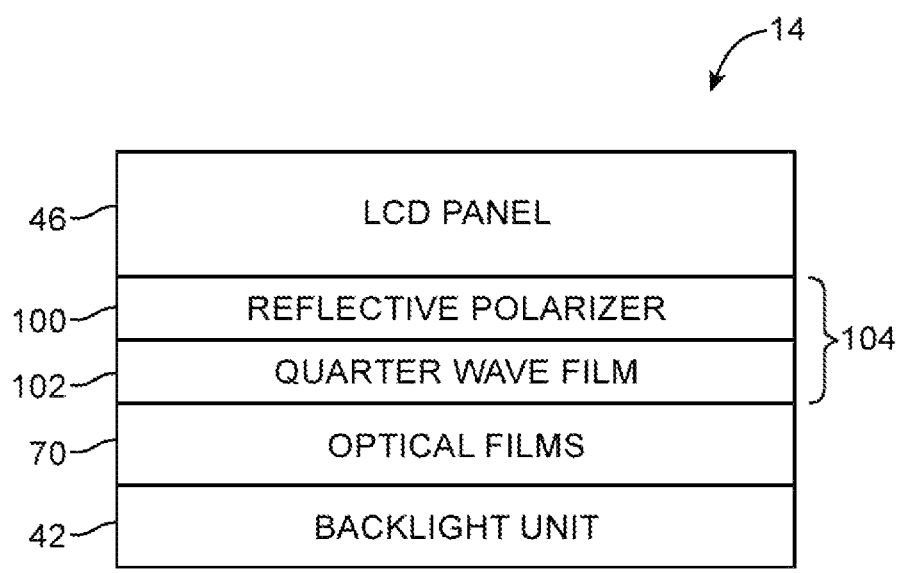
FIG. 5 is a cross-sectional view of an illustrative display including a backlight unit, a reflective polarizer, and a quarter-wave film in accordance with an embodiment of the present invention.

A cross-sectional side view display 14 of device (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42, a display module such as display layers 46 (e.g., a liquid crystal display (LCD) panel), and additional light processing layers such as optical films 70, a light retardation layer such as quarter wave film (QWF) 102, and reflective polarizer 100. The QWF helps increase the efficiency of the reflective polarizer. The mechanisms for improving efficiency are explained in further details later.

If desired, optical films 70 may be formed as a portion of backlight unit 42 or may be formed separately from backlight unit 42. Quarter wave film 102 may be located between optical films 70 and reflective polarizer 100. However, this is merely illustrative. If desired, quarter wave film 102 may be located between one or more of optical films 70, between optical films 70 and backlight unit 42, or within backlight unit 42.

Figure 6:
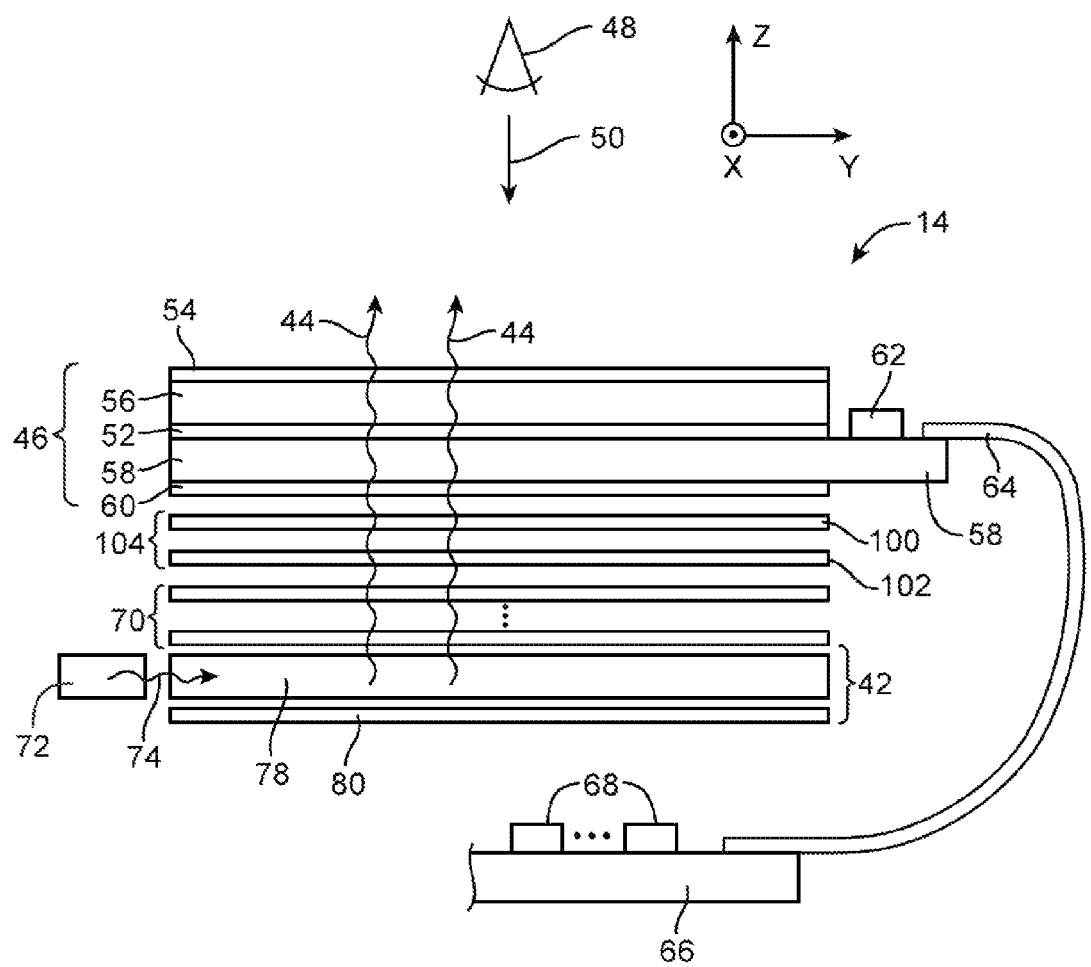
FIG. 6 is a cross-sectional side view of an illustrative display in accordance with an embodiment of the present invention.

A cross-sectional side view of one illustrative configuration for display 14 of device 10 (e.g., for display 14 of the devices of FIG. 1, FIG. 2, FIG. 3, FIG. 4 or other suitable electronic devices) incorporating the elements of FIG. 5 is shown in FIG. 6.

As shown in FIG. 6, backlight structures 42 may be used for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry (e.g., one or more integrated circuits such as components 68 on printed circuit 66 of FIG. 5) may be used to generate information to be displayed on display (e.g., display data). The information to be displayed may be conveyed from circuitry 68 to display driver integrated circuit 62 using a signal path such as a signal path formed from conductive metal traces in flexible printed circuit 64 (as an example).

Display driver integrated circuit 62 may be mounted on thin-film-transistor layer driver ledge 82 or elsewhere in device 10. A flexible printed circuit cable such as flexible printed circuit 64 may be used in routing signals between printed circuit 66 and thin-film-transistor layer 58. If desired, display driver integrated circuit 62 may be mounted on printed circuit 66 or flexible printed circuit 64. Printed circuit 66 may be formed from a rigid printed circuit board (e.g., a layer of fiberglass-filled epoxy) or a flexible printed circuit (e.g., a flexible sheet of polyimide or other flexible polymer layer).

Backlight structures 42 may include a light guide element such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into the edge surface of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70 and additional optical layers such as quarter wave film (QWF) stack 104.

Optical films 70 may include diffuser layers (diffuser films) for helping to homogenize backlight 44 and thereby reduce hotspots, compensation films for enhancing off-axis viewing, and brightness enhancement films (also sometimes referred to as turning films) or other prism films for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

QWF stack 104 may include a light retardation film such as quarter wave film 102 and a polarizer such as reflective polarizer 100. QWF 102 may be located between reflective polarizer 100 and optical films 70 as shown in FIG. 6. However, this is merely illustrative. If desired, QWF 102 may be located at any suitable location between reflective polarizer 100 and reflector 80 of backlight structures 42.

QWF stack 104 may vary in various embodiments as shown in FIGS. 7, 8, 9, 10, and 11. As shown in FIG. 7, QWF stack 104 may include a QWF 102 formed from a uniaxial QWF having an in-plane slow axis and an in-plane fast axis, which are both parallel to the surface of QWF 102. The uniaxial QFW may be formed by stretching a polymer film along a single direction. This stretching direction is either along the in-plane slow axis or the in-plane fast axis.

As shown in FIG. 8, QWF stack 104 may include a QWF 102 formed from a uniaxial QWF and a uniaxial c-film 312 on a bottom surface of the uniaxial QWF. Uniaxial c-film 312 has an optical axis normal to plane of c-film 312. Uniaxial c-film 312 may be included to compensate for the viewing angle dependence of QWF 102.

As shown in FIG. 9, QWF stack 104 may include a QWF 102 formed from a uniaxial QWF and uniaxial c-film 312 on the top surface of the uniaxial QFW 102 (e.g., between QWF 102 and reflective polarizer 100). Uniaxial c-film 312 has an optical axis normal to the plane of c-film 312. Uniaxial c-film 312 may be included to compensate for the viewing angle dependence of QFW 102.

As shown in FIG. 10, QWF stack 104 may include a QWF 102 formed from a uniaxial QWF, uniaxial c-film 312a on the top surface of the uniaxial QWF 102, and uniaxial c-film 312b on the bottom surface of the uniaxial QWF 102. Uniaxial c-film 312a and uniaxial c-film 312b both have an optical axis normal to their own film surface. Uniaxial c-film 312a and uniaxial c-film 312b may be included to compensate for the viewing angle dependence of QFW 102.

As shown in FIG. 11, QWF stack 104 may include a QWF 102 formed from a biaxial QWF having an in-plane phase retardation between an in-plane slow axis and an in-plane fast axis, and also an out-of-plane phase retardation. A biaxial QWF of this type may be formed by stretching a semi-crystalline polymer film along two perpendicular directions. Such a semi-crystalline polymer film includes but not limited to polypropylene film, polyethylene terephthalate (PET) film, or other polymer films.

QWF 102 may be a wave retarder that is formed of birefringent materials. Birefringence is the optical property of a material having a refractive index that depends on the polarization and propagation direction of light. A wave retarder alters the polarization state or phase of light traveling therethrough. The wave retarder has a slow axis that is also referred to an extraordinary axis, and a fast axis that is also referred to an ordinary axis. As polarized light passes through the wave retarder, the light along the fast axis travels more quickly than along the slow axis.

A quarter wave film retards the velocity of one of the polarization components (x or y), such that the one of the polarization components is one quarter of a wavelength out of phase from the other polarization component (y or x). Polarized light passing through a quarter wave retarder thus becomes circularly polarized, which is also referred to as twisting or rotating the polarized light. The retardation of a QWF is expressed in Equation (1)

$$\text{Retardation} = (n_e - n_o)t \qquad \text{Equation (1)}$$

where $n_e$ is a refractive index along an extraordinary axis, $n_o$ is a refractive index along an ordinary axis, and t is a thickness of the QWF.

Referring to FIGS. 7-11 again, in order to improve light recycling efficiency, the uniaxial QWF and the biaxial QWF may have an in-plane retardation ranging from 50 nm to 200 nm (for example) between the in-plane slow axis and the in-plane fast axis of the QWF. The in-plane retardation between the in-plane slow axis and the in-plane fast axis may be in the range of 100 nm to 160 nm (for example). In a particular embodiment, the in-plane retardation between the in-plane slow axis and the in-plane fast axis may be about 137.5 nm.

Referring to FIGS. 7-11 again, reflective polarizer 100 may transmit linearly polarized light along a first axis and reflect linearly polarized light along a second axis that is perpendicular to the first axis. The in-plane slow axis of the uniaxial QWF or the in-plane slow axis of the biaxial QWF may form an angle ranging from 30 to 60 degrees or ranging from 120 to 150 degrees (as examples) with respect to the first axis or the second axis of the reflective polarizer.

In one particular embodiment, the in-plane slow axis of the uniaxial QWF or the in-plane slow axis of the biaxial QWF may form an angle ranging from about 40-50 degrees or about 130-140 degrees (as examples) with respect to the first axis or the second axis of the reflective polarizer.

In another particular embodiment, the in-plane slow axis of the uniaxial QWF or the in-plane slow axis of the biaxial QWF may form an angle about 45 degrees or about 135 degrees (as examples) with respect to the first axis or the second axis of the reflective polarizer.

Referring to FIGS. 7-11 again, reflective polarizer 100 may transmit a first circularly polarized light (right-handed or left-handed) and reflect a second circularly polarized light (left-handed or right-handed) that is orthogonal to the first circularly polarized light. The in-plane slow axis of the uniaxial QWF or the biaxial QWF may have no orientation constraint as long as the in-plane slow axis is substantially parallel to the surface of QWF 102.

Optical films that may be used in various embodiments described herein include diffuser films and prism films. A diffuser film is used to provide more uniform light distribution toward the LCD panel and hide cosmetic defects. A prism film is used to collimate the light such that the light output from the light guiding element can be collimated toward the LCD panel in a direction that is perpendicular to (e.g. normal to) the LCD panel surface.

Figure 12:
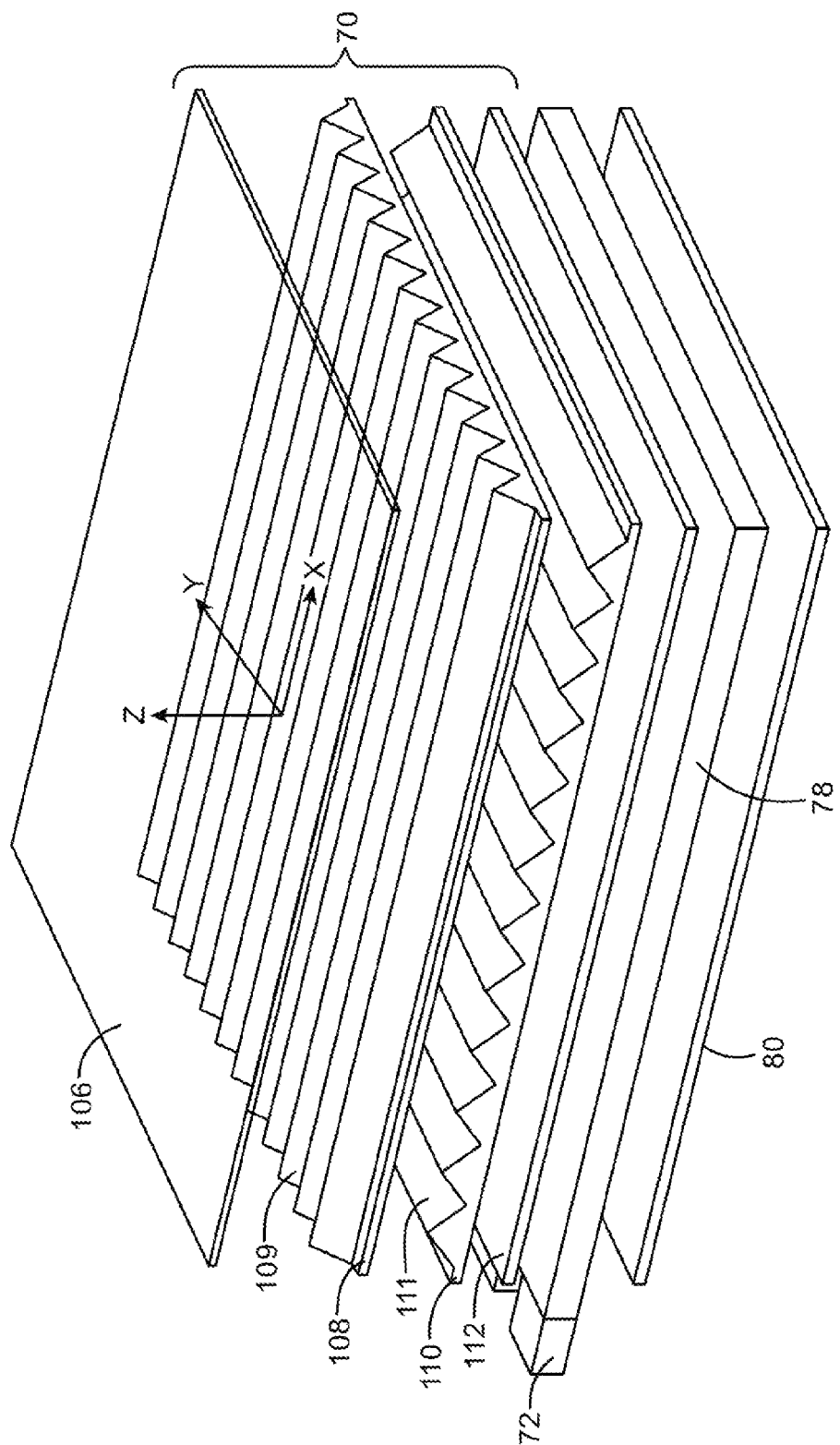
FIG. 12 is a perspective view of an illustrative backlight unit and optical films including two face-up prism films in accordance with an embodiment of the present invention.

As shown in FIG. 12, in one suitable configuration, optical films 70 may include two face-up prism films such as face-up prism film 108 and face-up prism film 110. Prism films 108 and 110 may be interposed between diffuser film 106 and diffuser film 112. Face-up prism film 108 may have prism elements 109 facing toward the reflective polarizer and display module 46. Face-up prism film 110 may have prism elements 111 facing toward the prism film 108. As shown, prism elements 109 and 111 of face-up prism films 108 and 110 may be arranged to be perpendicular to each other (e.g., prisms 109 and 111 may be offset from one another by a 90 degree angle).

Two crossed face-up prism films of this type can rotate the angle of the light output from light guide element 78 to be normal to the LCD panel surface.

Figure 13:
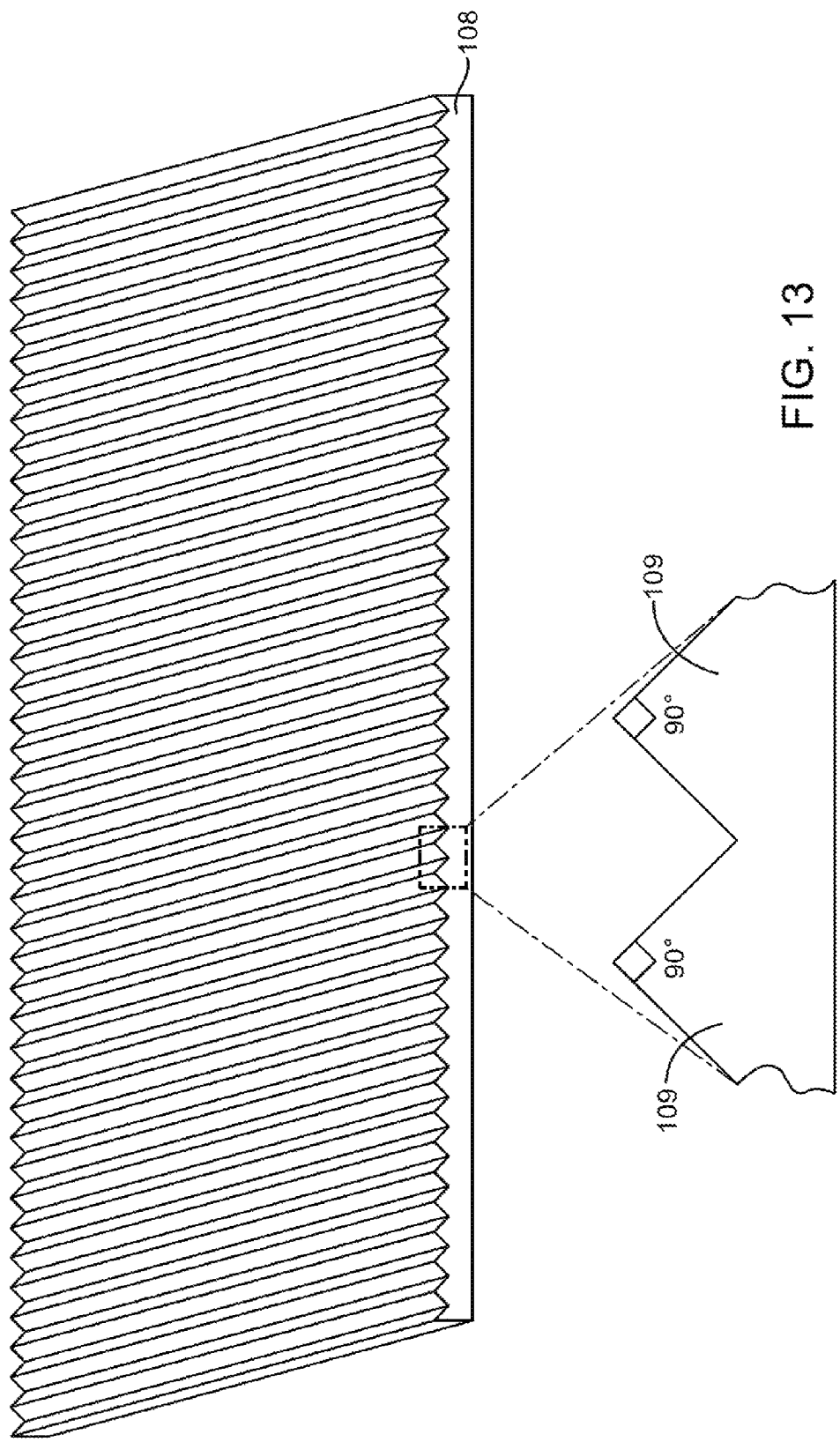
FIG. 13 is an enlarged view one of the two face-up prism films of FIG. 12 in accordance with an embodiment of the present invention.

FIG. 13 illustrates an enlarged view of one of the face-up prism films of FIG. 12. The prism pitch or distance between two nearest prisms 109 may vary from, for example, 5 microns to 300 microns. Prism elements 109 (or prism elements 111) of each of the two face-up prisms may also have an apex angle of 90 degrees as shown in FIG. 13, although prisms with different apex angles may be used.

The configuration of FIGS. 12 and 13 is merely illustrative. If desired, optical films 70 may include a different set of optical films from those described above in connection with FIG. 12.

Figure 14:
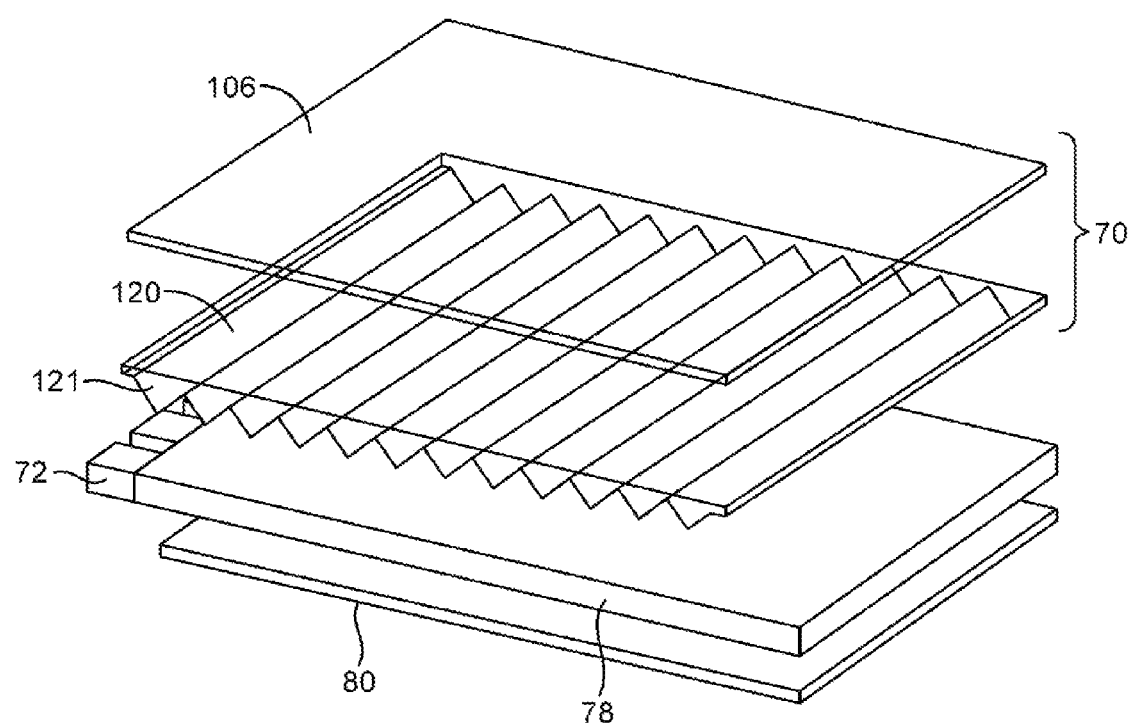
FIG. 14 is a perspective view of an illustrative backlight unit and optical films including a face-down prism film in accordance with an embodiment of the present invention.

As shown in FIG. 14, in another suitable configuration, optical films 70 may include a single diffuser film such as diffuser film 106 and a turning film such as face-down prism film 120 having prism elements 121. Face-down prism film 120 has prisms 121 facing toward light guide element 78 of backlight unit 42.

Figure 15:
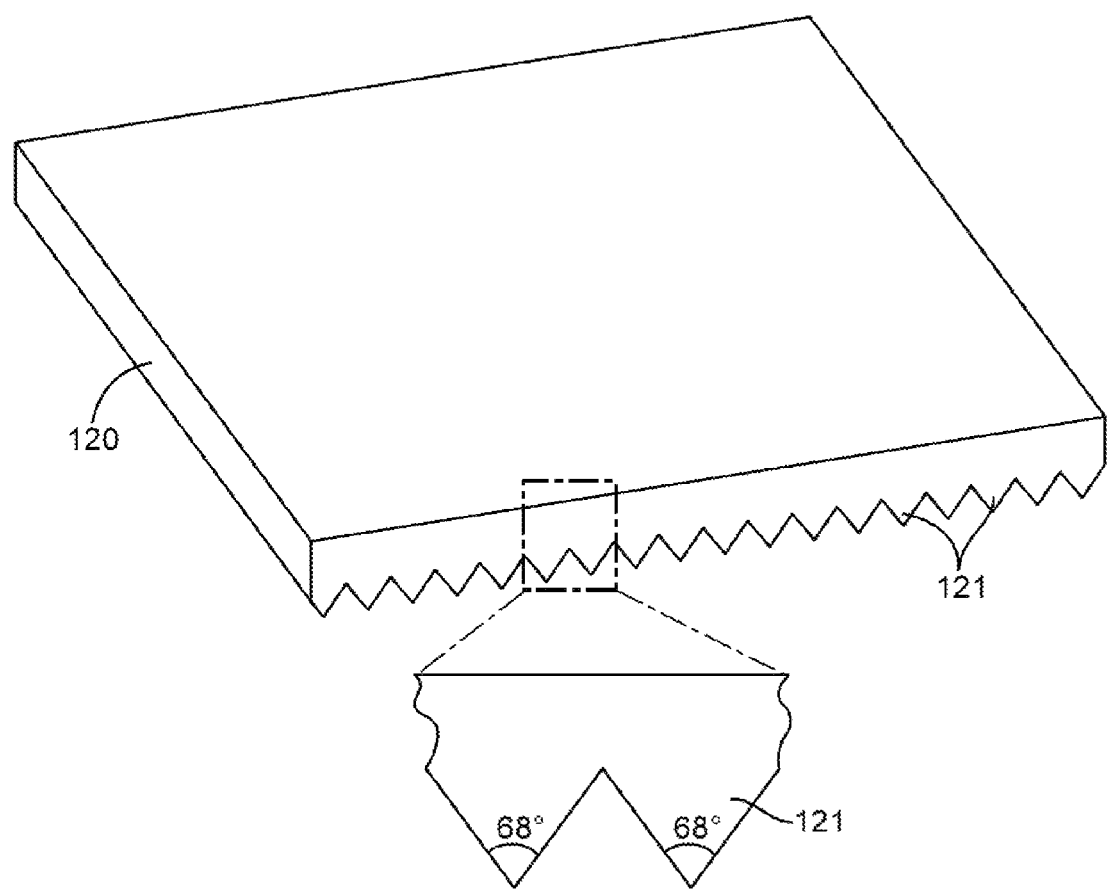
FIG. 15 is an enlarged view of the face-down prism film of FIG. 14 in accordance with an embodiment of the present invention.

FIG. 15 illustrates an enlarged view of face-down prism 120 of FIG. 14. In the example of FIG. 15, face-down prism film elements 122 have an apex angle of 68 degrees. However, this is merely illustrative. Generally, the apex angle may vary from 58 degrees to 78 degrees (for example). The pitch (i.e., the distance between prisms 121) may vary from, for example, 5 microns to 300 microns (for example).

When partially polarized light passes through a stack of optical films 70, which may include a bottom diffuser, one or more prism films or turning films, and a top diffuser, the partially polarized light may become further depolarized. For example, if optical films 70 include two face-up prism films (e.g., films 108 and 110 of FIG. 12), the partially polarized light becomes less polarized before entering reflective polarizer 100. If optical films 70 include a single face-down prism (e.g., film 120 of FIG. 14), the input partially polarized light also becomes less polarized. However, the depolarization effect of a single face-down prism is usually less than that of two face-up prisms. This can be verified by measuring the luminance ratio of two polarized components, such as the ratio of a p-component to an s-component of the light.

Light may have a p-component and an s-component that is perpendicular to the p-component. A luminance ratio of the p-component to the s-component may be used to determine the degree of polarization light. Generally, an optical film with a luminance ratio (p-component/s-component) close to 1 generates a relatively larger depolarization effect than another optical film with a luminance ratio (p-component/s-component) that is relatively further away from 1 (e.g., either smaller than or larger than 1). When the luminance ratio is lower than 1, the s-component is more dominant than the p-component. On the contrary, when the luminance ratio is greater than 1, the p-component is more dominant than the s-component.

Diffuser films (e.g., top diffuser 106 and bottom diffuser 112 of FIG. 12 or diffuser 106 of FIG. 14) may also have an impact on the degree of polarization of light that has passed through the top diffuser or the bottom diffuser.

Diffuser films may also vary from manufacturer to manufacturer. For example, a diffuser from one manufacturer may depolarize more than a diffuser from an alternative manufacturer.

In order to reduce this type of depolarization effect, the base film of a diffuser film may be a film that is either optically isotropic or a film that has relatively low (near zero) in-plane birefringence. In this way, the base film of the diffuser sheet may be arranged to have a small or negligible impact on the polarization of the input light.

In order to reduce depolarization effects from prism films, the base film of a prism film may be a film that is either optically isotropic or a film that has relatively low (near zero) in-plane birefringence. Alternatively, to have less depolarization effect, the base film of the prism film may have an in-plane optical axis that is either parallel or perpendicular to the prism orientation direction.

Display 14 may have optical films 70 and QWF stack 104 each having one of several arrangements. As examples, QWF stack 104 may include a reflective polarizer and a quarter wave film or may include only a reflective polarizer without any quarter wave film. As examples, optical films 70 may include two crossed face-up prism films, a single face-down prism film, or may be provided without any prism films.

It has been found that, for any of the above-mentioned optical film stacks, providing a display with a reflective polarizer increases the efficiency with which light is output from the display and providing a display with a reflective polarizer and a quarter wave film that is interposed between the reflective polarizer and the reflector of the backlight unit further increases the efficiency with which light is output from the display.

Figure 25:
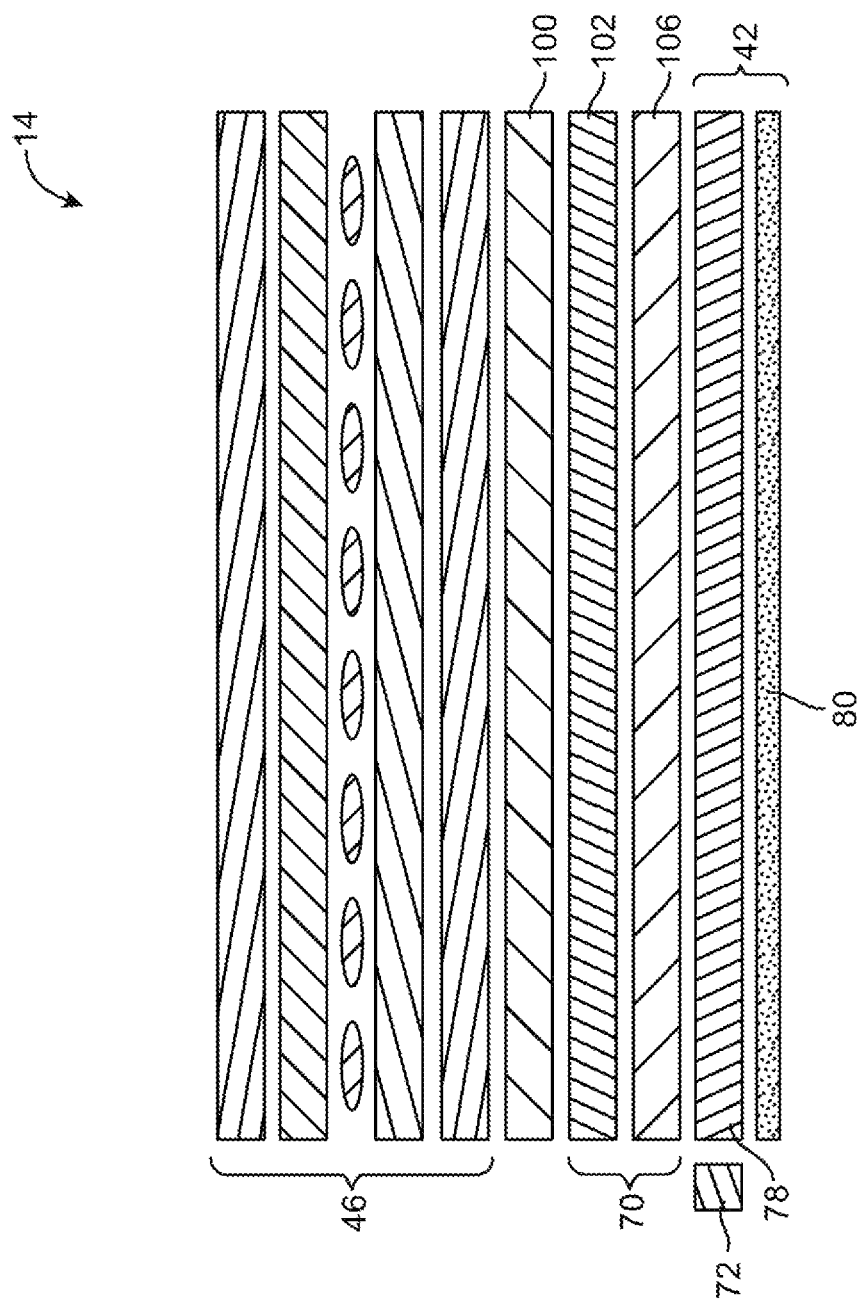
FIG. 25 is a cross-sectional view of an illustrative display including a backlight unit, a reflective polarizer, and a quarter wave film between a reflective polarizer and a diffuser film in accordance with an embodiment of the present invention.
Figure 26:
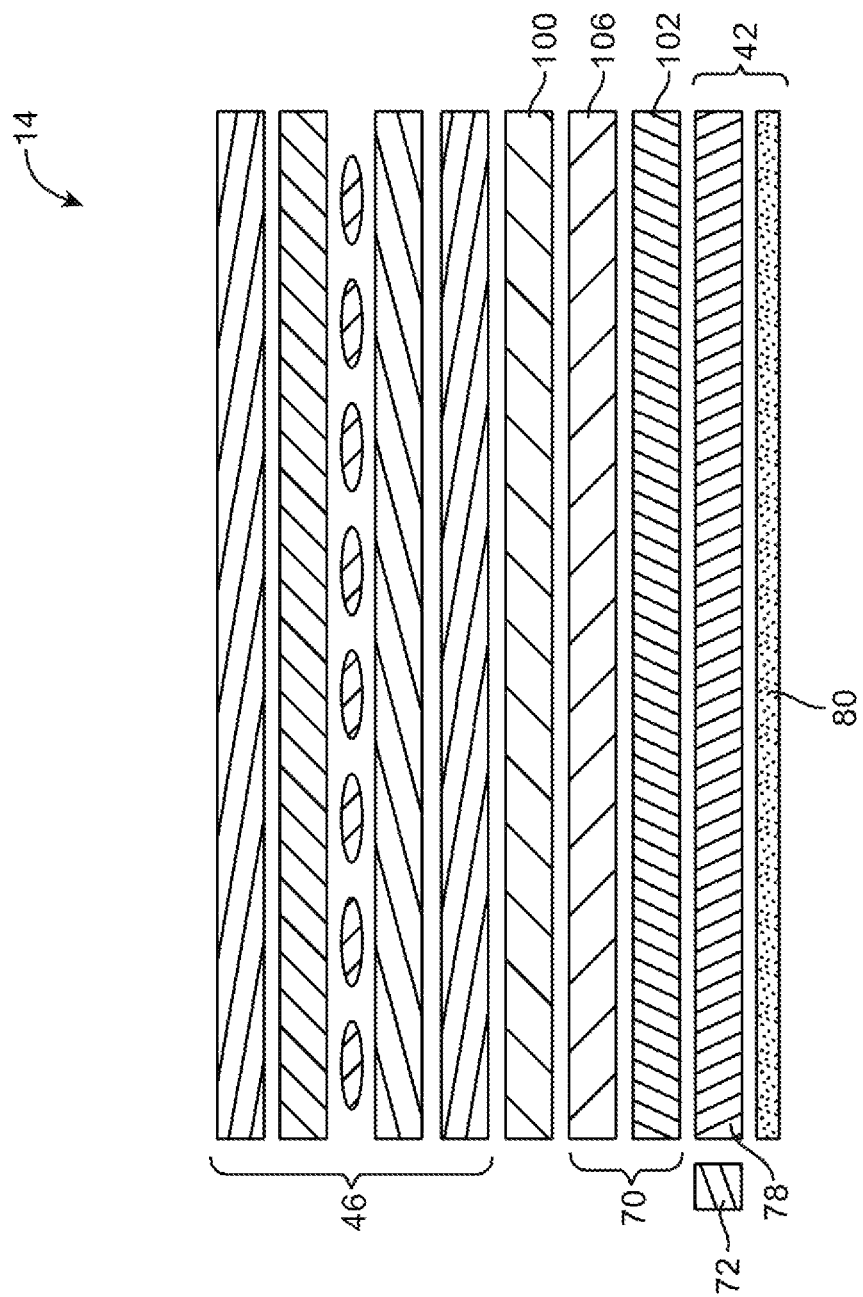
FIG. 26 is a cross-sectional of an illustrative display including a backlight unit, a reflective polarizer, and a quarter wave film between a diffuser and a light guide element in accordance with an embodiment of the present invention.
Figure 27:
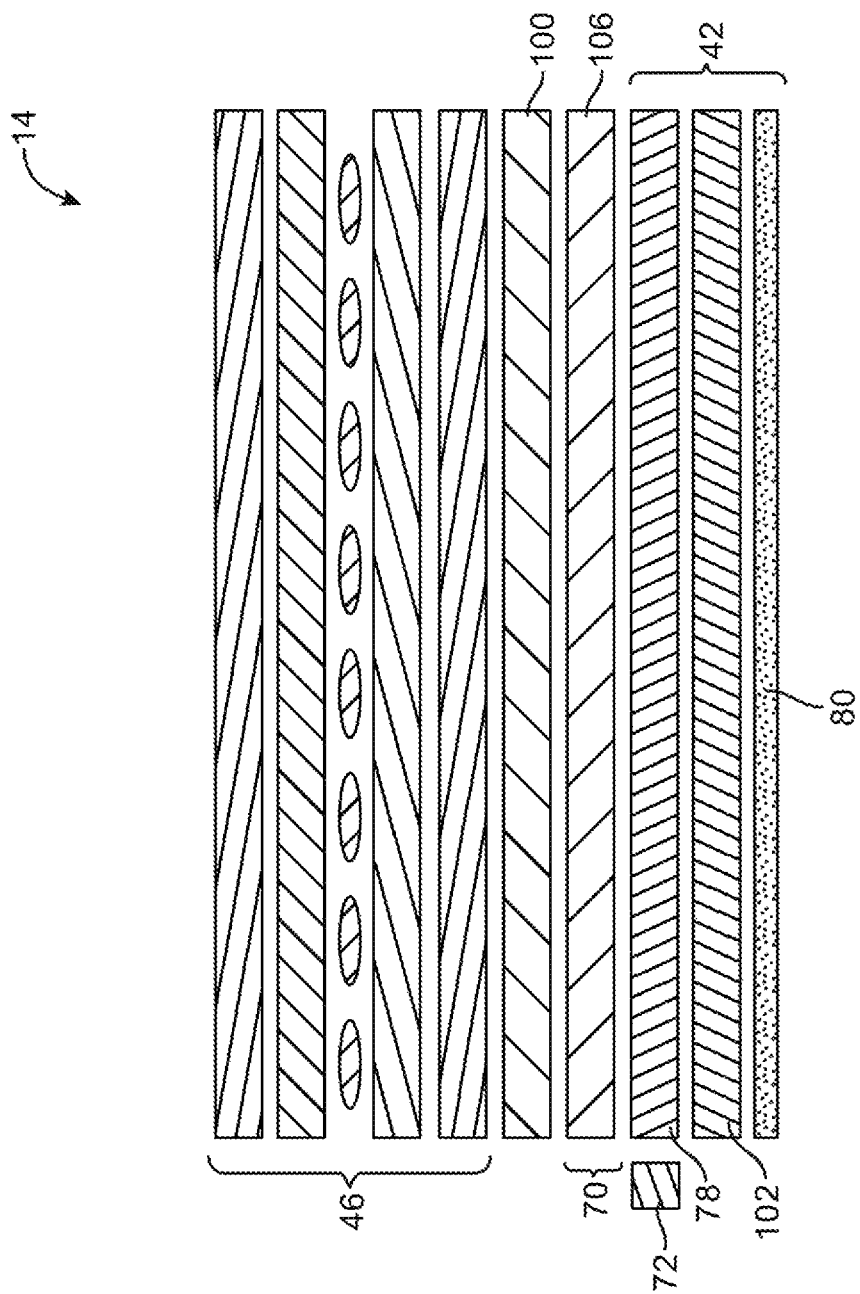
FIG. 27 is a cross-sectional view of an illustrative display including a backlight unit, a reflective polarizer, and a quarter wave film between a light guide element and a reflector film in accordance with an embodiment of the present invention.

Illustrative configurations for display 14 in which display 14 includes a reflective polarizer and optical films 70 that include a diffuser film and a single face-down prism film are shown in FIGS. 16, 17, 18, and 19. Illustrative configurations for display 14 in which display 14 includes a reflective polarizer and optical films 70 that include top and bottom diffuser films and two crossed face-up prism films are shown in FIGS. 20, 21, 22, 23, and 24. Illustrative configurations for display 14 in which display 14 includes a reflective polarizer and optical films 70 that include a diffuser film and no prism film are shown in FIGS. 25, 26, and 27.

Figure 16:
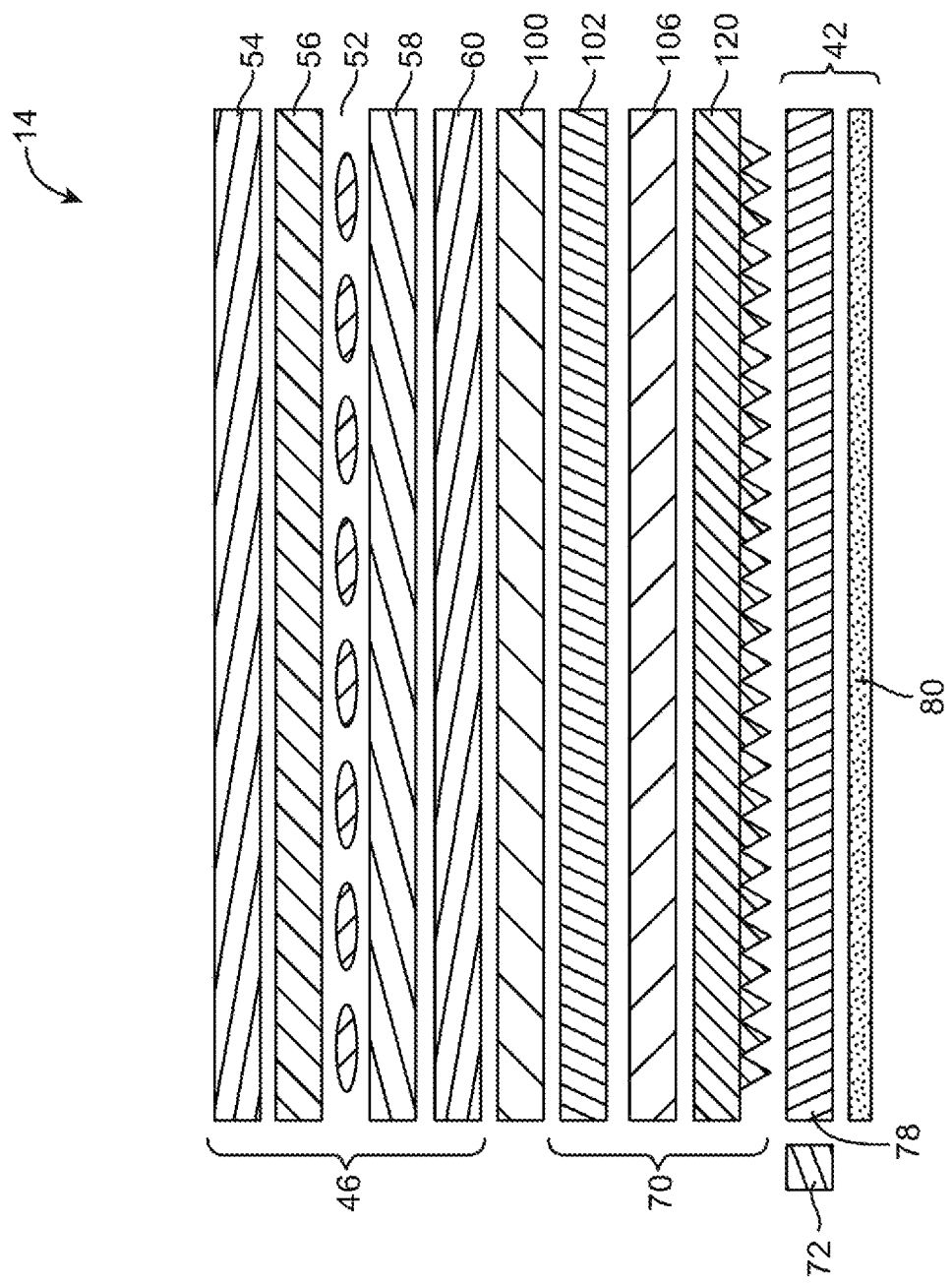
FIG. 16 is a cross-sectional view of an illustrative display including a backlight unit, a face-down prism film, a reflective polarizer, and a quarter wave film between a reflective polarizer and a diffuser film in accordance with an embodiment of the present invention.

As shown in FIG. 16, display 14 may include backlight unit 42, optical films 70 having diffuser film 106 and face-down prism film 120, reflective polarizer 100, and quarter wave film 102 formed between reflective polarizer 100 and diffuser film 106. Reflective polarizer 100 may be formed between optical films 70 and display module 46. Reflective polarizer 100 may be formed adjacent to lower polarizer 60 of display module 46. In the example of FIG. 16, quarter wave film 102 forms a top layer of optical films 70. In this example, QWF 102 may be laminated to the bottom surface of reflective polarizer 100 or may be a standalone film. The configuration of display 14 of FIG. 16 in which optical films 70 include diffuser layer 106 and face-down prism film 120 and in which QWF 102 is formed between diffuser 106 and reflective polarizer 100 is merely illustrative. QWF 102 may be formed in other locations in display 14 having optical films 70 that include diffuser layer 106 and face-down prism 120 as described below in connection with FIGS. 17, 18, and 19.

Figure 17:
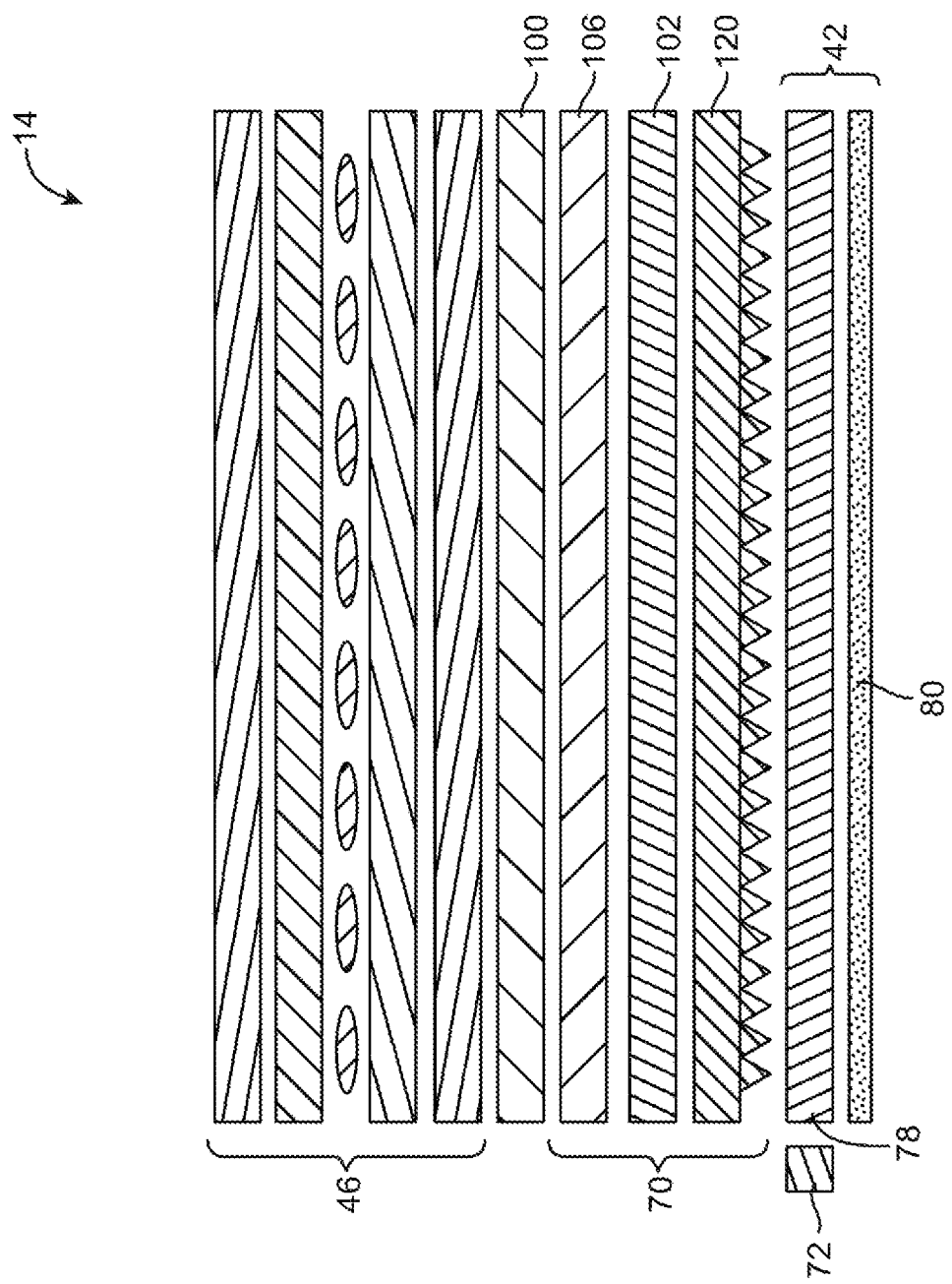
FIG. 17 is a cross-sectional view of an illustrative display including a backlight unit, a face-down prism film, a reflective polarizer, and a quarter wave film between a diffuser film and the face-down prism film in accordance with an embodiment of the present invention.

If desired, QWF 102 may be formed between diffuser film 106 and face-down prism film 120 as shown in FIG. 17. In this type of configuration, QWF 102 may be laminated to the bottom surface of diffuser 106, or may be a standalone film.

Figure 18:
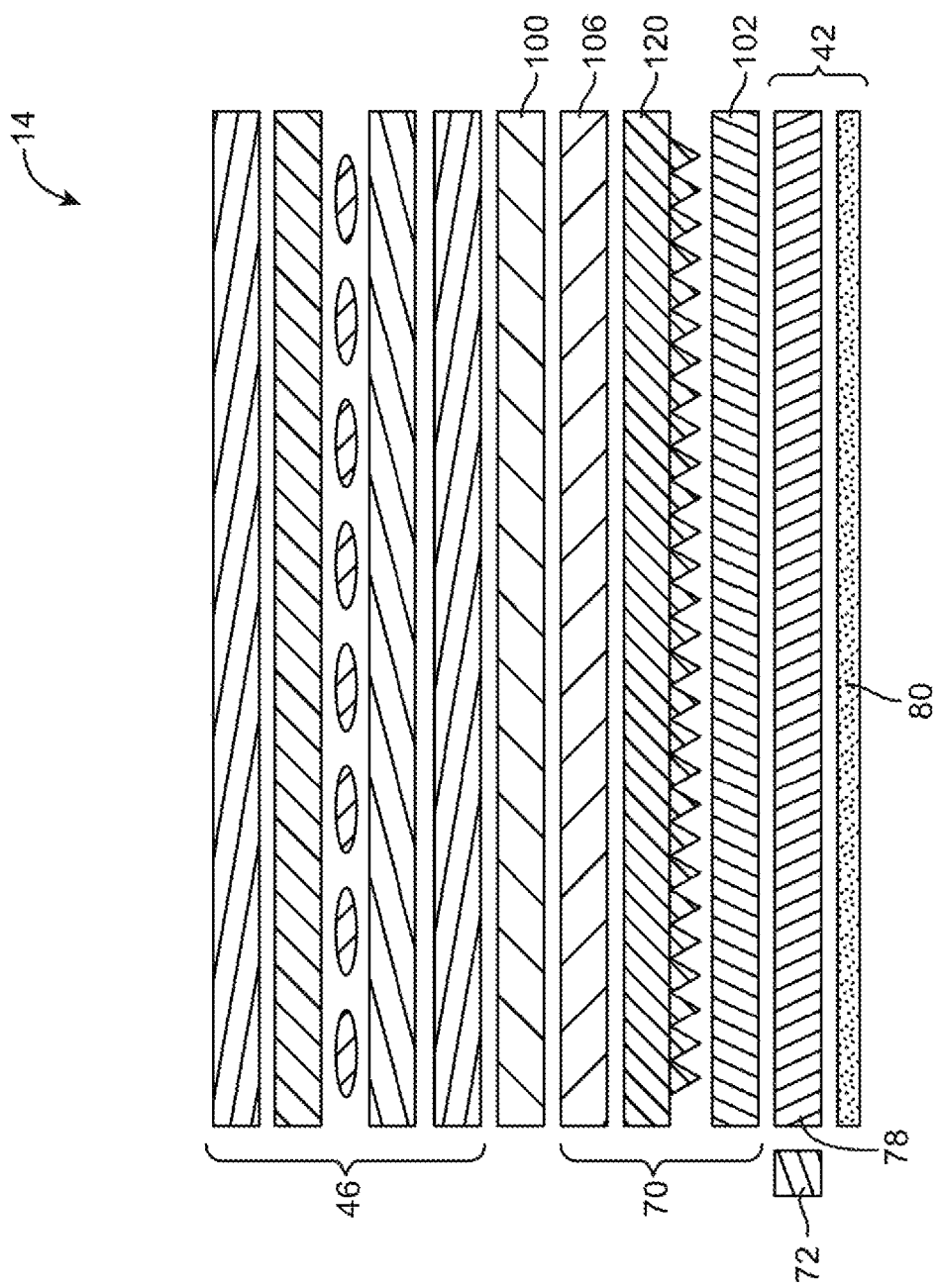
FIG. 18 is a cross-sectional view of an illustrative display including a backlight unit, a face-down prism film, a reflective polarizer, and a quarter wave film between the face-down prism film and a light guide element in accordance with an embodiment of the present invention.

If desired, QWF 102 may be formed below prism film 120 (e.g., between prism film 120 and light guide element 78 of backlight unit 42) as shown in FIG. 18. In this type of configuration, QWF 102 may be laminated to the top surface of light guide element 78 or may be a standalone film.

Figure 19:
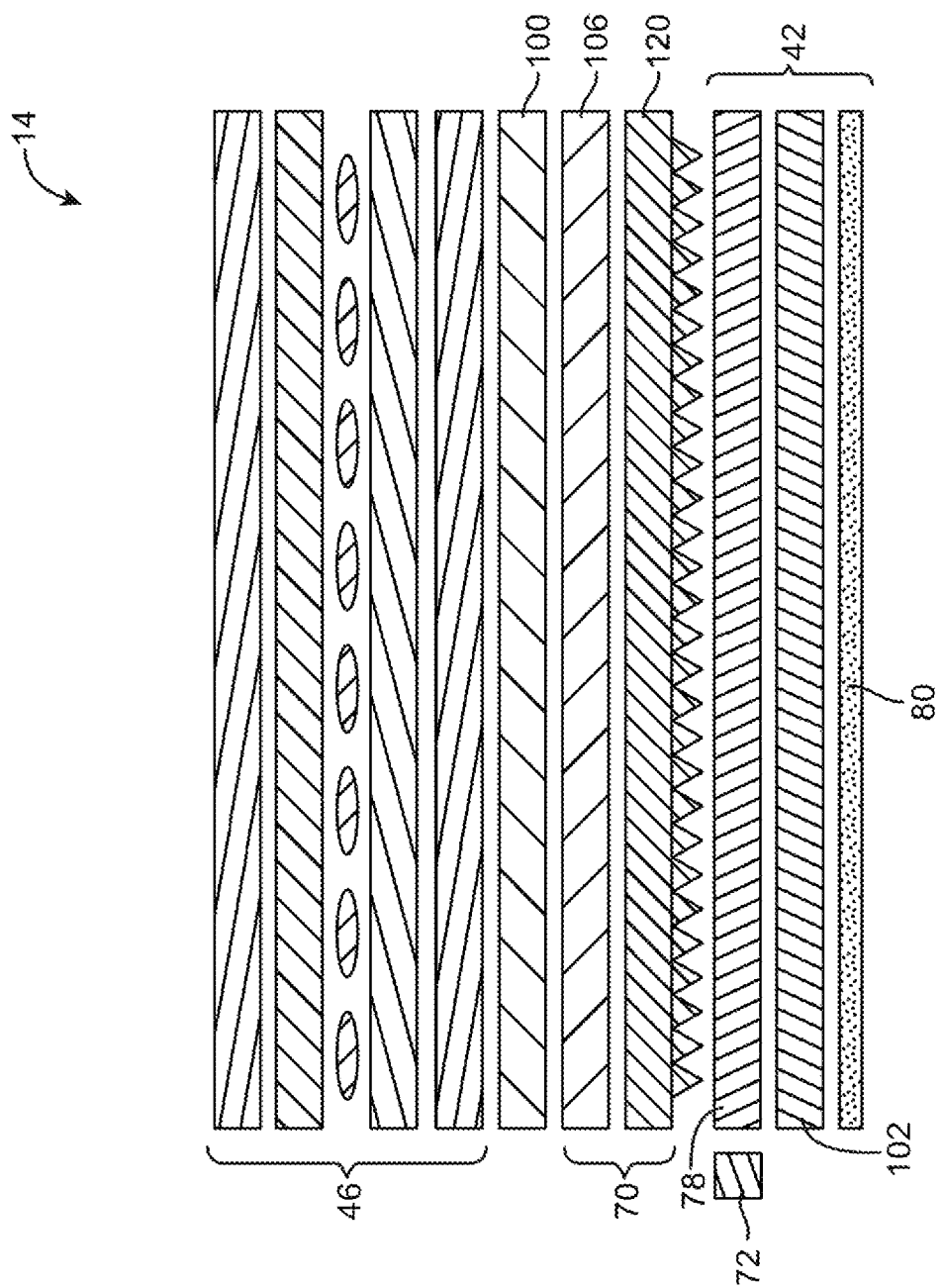
FIG. 19 is a cross-sectional view of an illustrative display including a backlight unit, a face-down prism film, a reflective polarizer, and a quarter wave film between a light guide element and a reflector film in accordance with an embodiment of the present invention.

If desired, QWF 102 may be formed as a layer of backlight unit 42 (e.g., between light guide element 78 and reflector 80 of backlight unit 42) as shown in FIG. 19. In this type of configuration, QWF 102 may be laminated to the top surface of reflector 80 or may be a standalone film.

Figure 20:
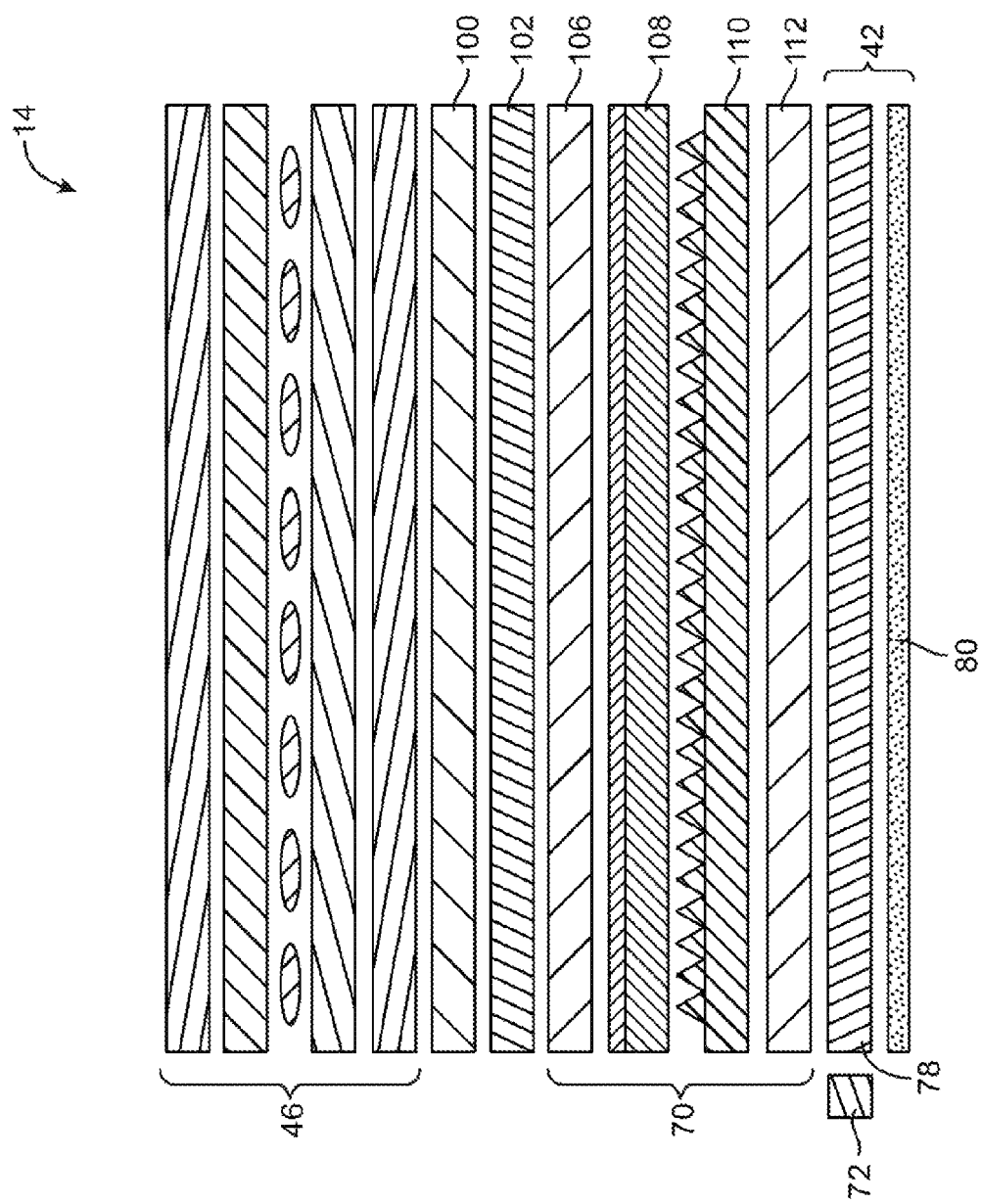
FIG. 20 is a cross-sectional of an illustrative display including a backlight unit, two face-up prism films, a reflective polarizer, and a quarter wave film between the reflective polarizer and a top diffuser film in accordance with an embodiment of the present invention.

As shown in FIG. 20, display 14 may include optical films 70 having diffuser film 106 implemented as a top diffuser, two crossed face-up prism films 108 and 110, and bottom diffuser 112. Optical films 70 may be interposed between QWF 102 and backlight unit 42. In the example of FIG. 20, reflective polarizer 100 and quarter wave film 102 are formed between diffuser film 106 and display module 46. Reflective polarizer 100 may be formed adjacent to lower polarizer 60 of display module 46. Quarter wave film 102 may be formed adjacent to diffuser film 106. In this example, QWF 102 may be laminated to the bottom surface of reflective polarizer 100 or may be a standalone film. The configuration of display 14 of FIG. 20 in which optical films 70 include a top diffuser, two crossed face-up prism films, and a bottom diffuser and in which QWF 102 is formed between diffuser 106 and reflective polarizer 100 is merely illustrative. QWF 102 may be formed in other locations in display 14 having optical films 70 that include a top diffuser, two crossed face-up prism films, and a bottom diffuser as described below in connection with FIGS. 21, 22, 23, and 24.

Figure 21:
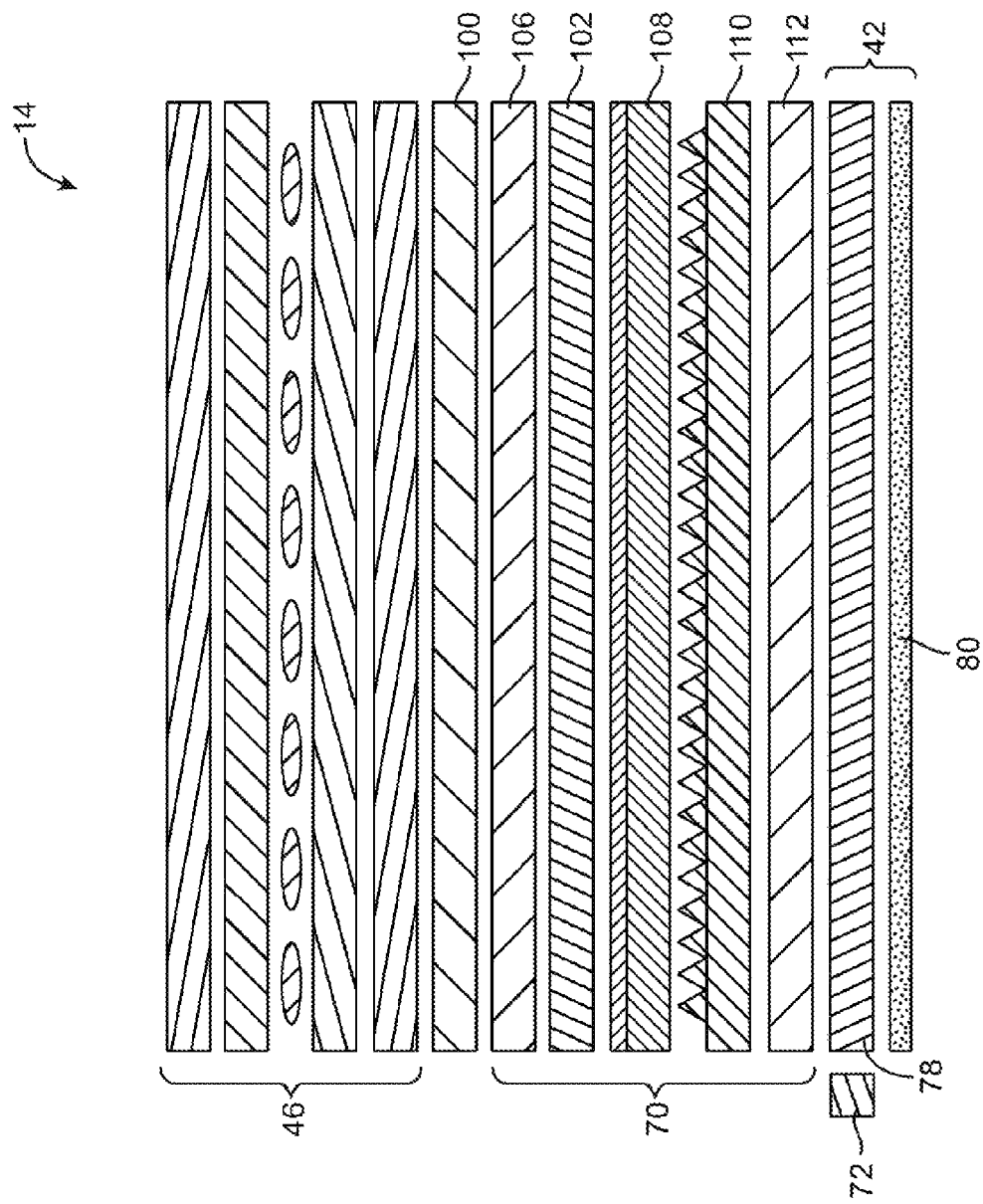
FIG. 21 is a cross-sectional view of an illustrative display including a backlight unit, two face-up prism films, a reflective polarizer, and a quarter wave film between a top diffuser and a top prism film in accordance with an embodiment of the present invention.

If desired, QWF 102 may be formed between diffuser film 106 and face-up prism film 108 as shown in FIG. 21. In this type of configuration, QWF 102 may be laminated to the bottom surface of diffuser 106, or may be a standalone film.

Figure 22:
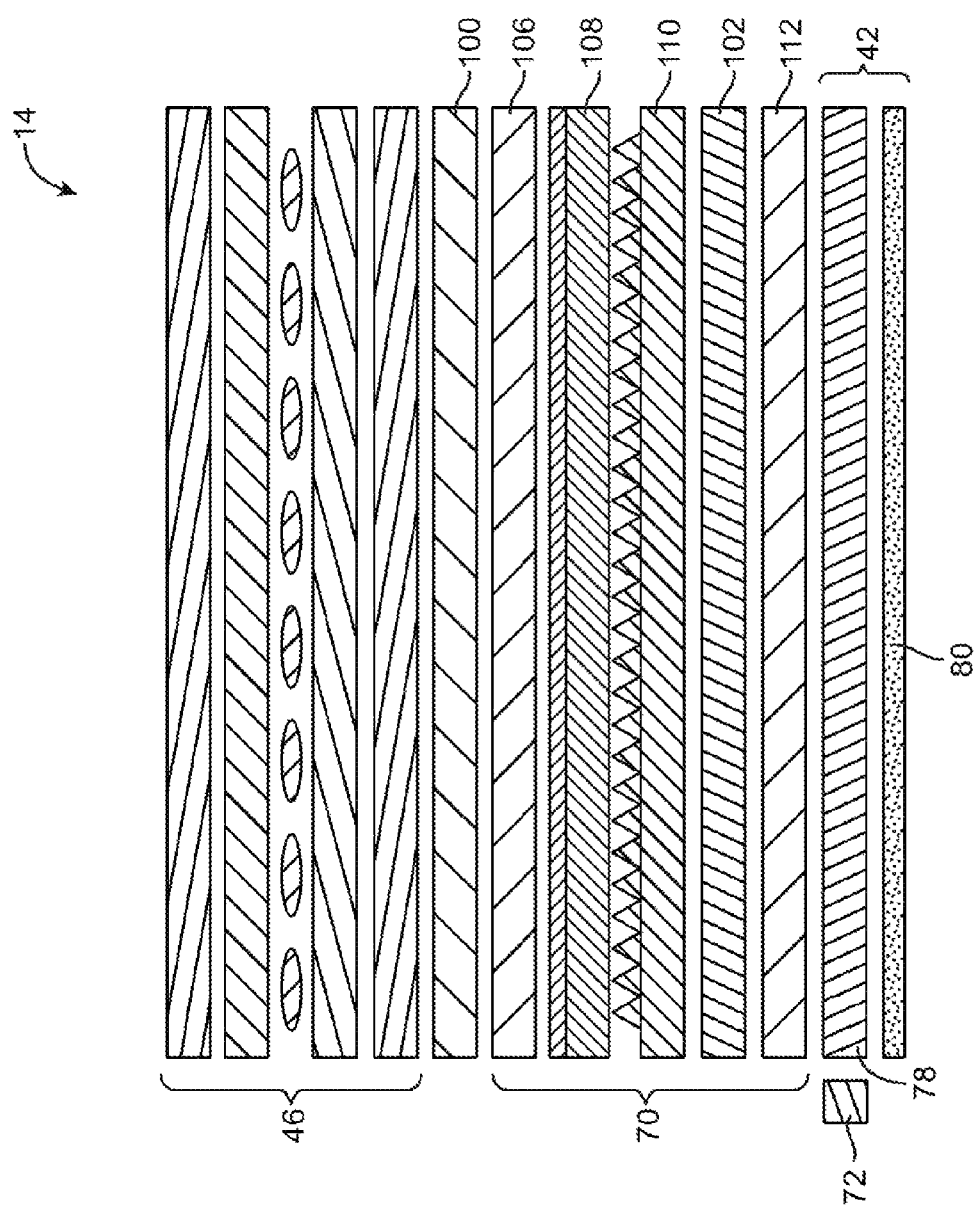
FIG. 22 is a cross-sectional of an illustrative display including a backlight unit, two face-up prism films, a reflective polarizer, and a quarter wave film between a bottom prism film and a bottom diffuser film in accordance with an embodiment of the present invention.

If desired, QWF 102 may be formed between diffuser film face-up prism film 110 and diffuser film 112 as shown in FIG. 22. In this type of configuration, QWF 102 may be laminated to the top surface of diffuser 112, or may be a standalone film.

Figure 23:
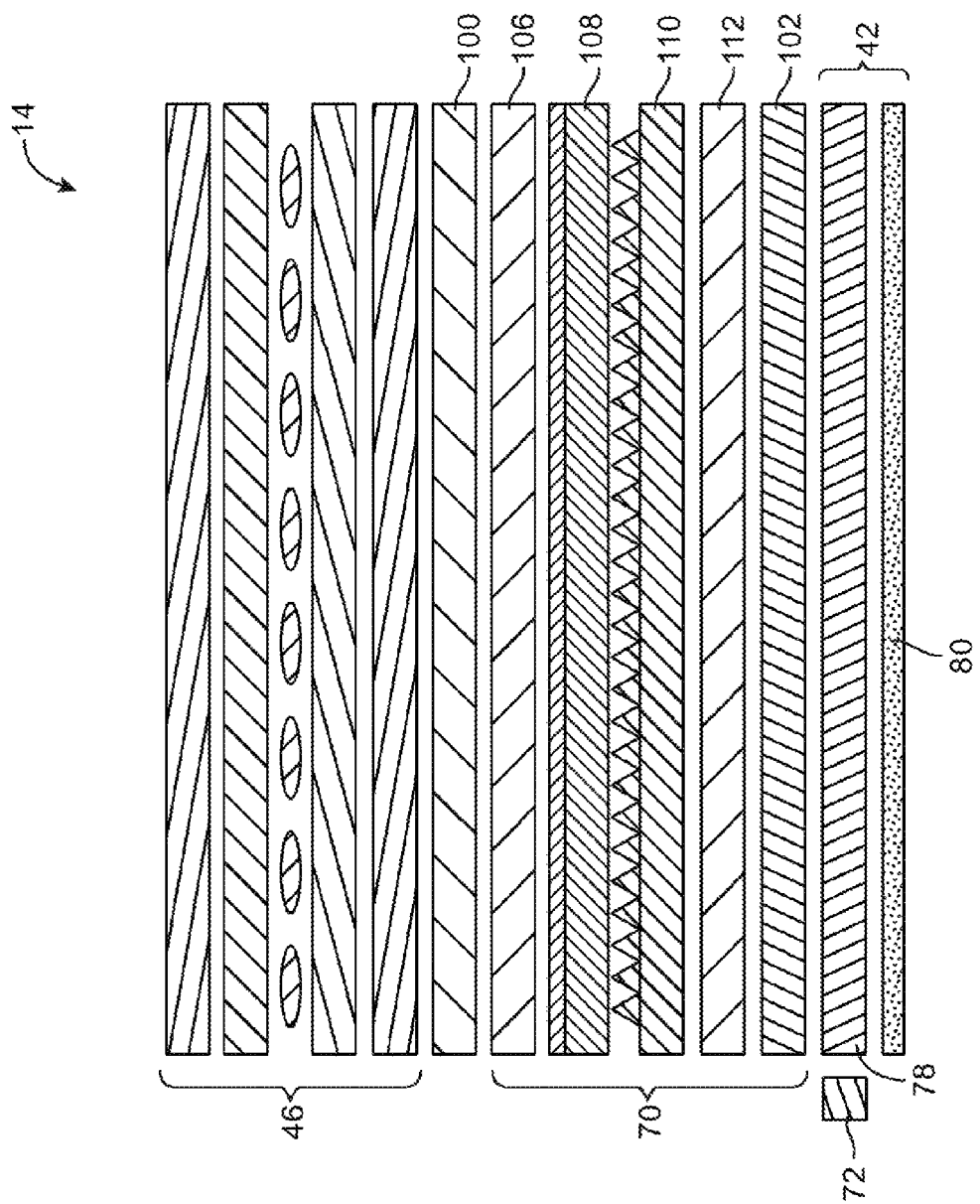
FIG. 23 is illustrates a cross-sectional view an illustrative display including a backlight unit, two face-up prism films, a reflective polarizer, and a quarter wave film between a bottom diffuser film and a light guide element in accordance with an embodiment of the present invention.

If desired, QWF 102 may be formed below diffuser film 112 (e.g., between diffuser 112 and light guide element 78 of backlight unit 42) as shown in FIG. 23. In this type of configuration, QWF 102 may be laminated to the top surface of light guide element 78 or may be a standalone film.

Figure 24:
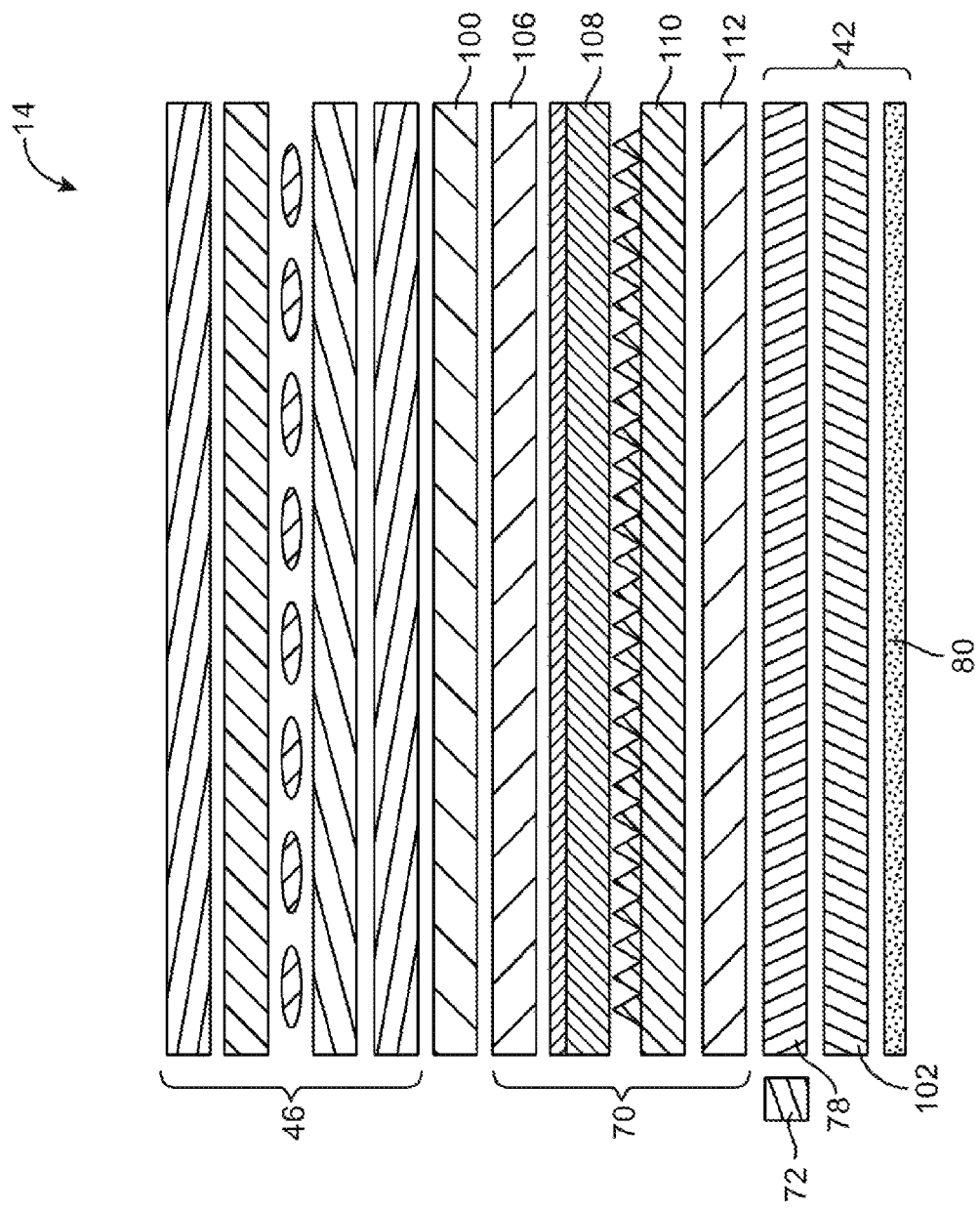
FIG. 24 is a cross-sectional view of an illustrative display including a backlight unit, two face-up prism films, a reflective polarizer, and a quarter wave film between a light guide element and a reflector film in accordance with an embodiment of the present invention.

If desired, QWF 102 may be formed as a layer of backlight unit 42 (e.g., between light guide element 78 and reflector 80 of backlight unit 42) as shown in FIG. 24. In this type of configuration, QWF 102 may be laminated to the top surface of reflector 80 or may be a standalone film.

As shown in FIG. 25, display 14 may include backlight unit 42, optical films 70 having diffuser film 106 and no prism films, reflective polarizer 100, and quarter wave film 102 formed between reflective polarizer 100 and diffuser film 106. Reflective polarizer 100 may be formed between optical films 70 and display module 46. Reflective polarizer 100 may be formed adjacent to lower polarizer 60 of display module 46. In the example of FIG. 25, quarter wave film 102 forms a top layer of optical films 70. In this example, QWF 102 may be laminated to the bottom surface of reflective polarizer 100 or may be a standalone film. The configuration of display 14 of FIG. 25 in which optical films 70 include diffuser layer 106 and QWF 102 formed between diffuser 106 and reflective polarizer 100 is merely illustrative. QWF 102 may be formed in other locations in display 14 having optical films 70 that include a diffuser layer and no prism films as described below in connection with FIGS. 26 and 27.

If desired, QWF 102 may be formed below diffuser film 106 (e.g., between diffuser film 106 and light guide element 78 of backlight unit 42) as shown in FIG. 26. In this type of configuration, QWF 102 may be laminated to the top surface of light guide element 78 or may be a standalone film.

If desired, QWF 102 may be formed as a layer of backlight unit 42 (e.g., between light guide element 78 and reflector 80 of backlight unit 42) as shown in FIG. 27. In this type of configuration, QWF 102 may be laminated to the top surface of reflector 80 or may be a standalone film.

Figure 28:
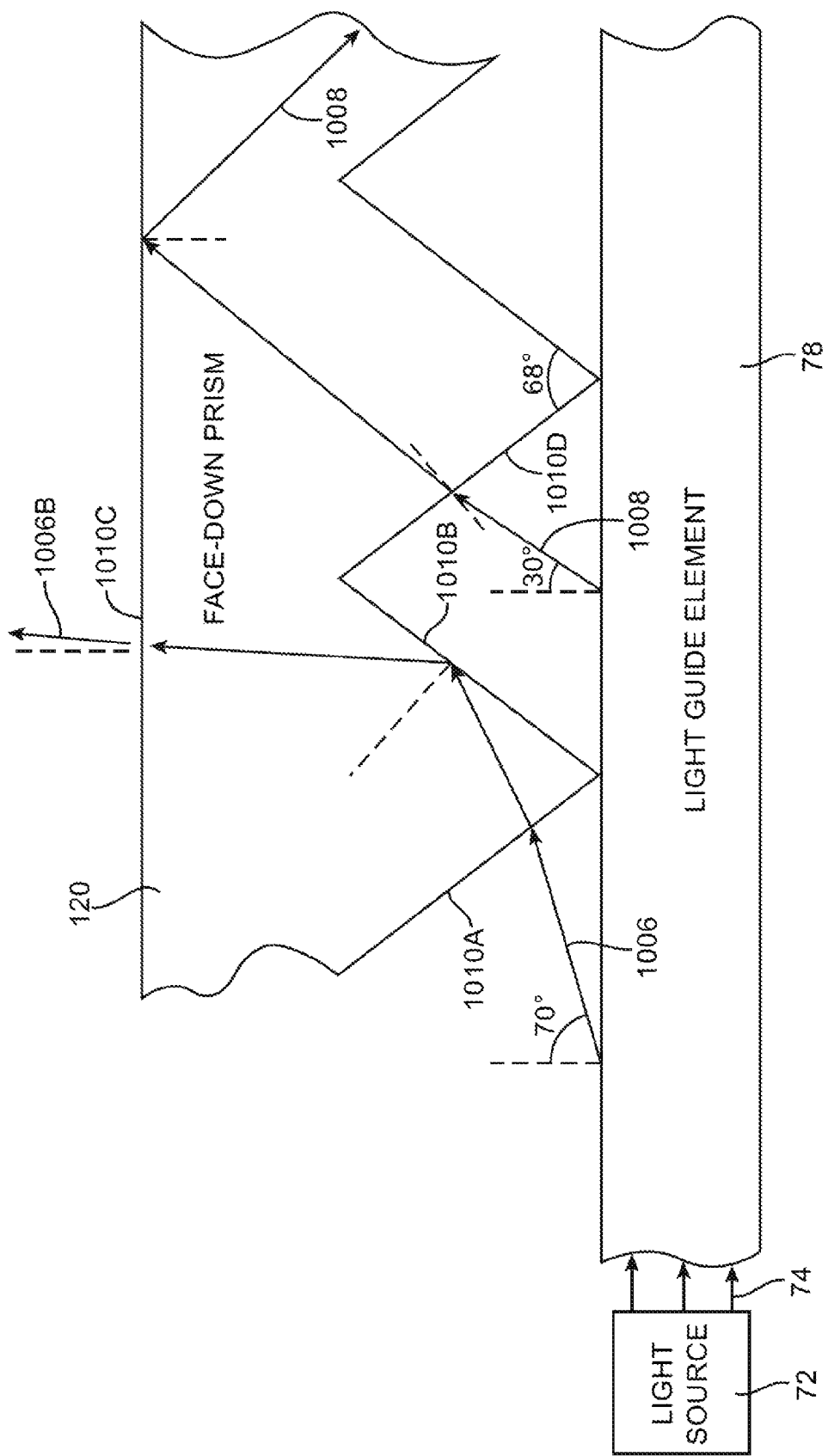
FIG. 28 is a diagram showing how light may be output from a light guide element and a face-down prism film in accordance with an embodiment of the present invention.

FIG. 28 illustrates light output from the light guide element of a display such as display 14 in a configuration that includes a face-down prism. As shown in FIG. 28, light 74 from light source 72 enters light guide element 78. A light ray such as light ray 1006 may exit light guide element 78 at about 70 degrees from the normal direction of light guide element 78 and refract into prism film 120 at a surface 1010A. The light then reflects from a surface 1010B and refracts from the prism at a surface 1010C, such that ray 1006B exiting from face-down prism 120 is nearly in a normal direction with respect to surface 1010C.

In another example, a light ray such as ray 1008 may exit light guide element 78 at an angle of 30 degrees from the normal direction, enters surface 1010D of prism film 120 at a very small incident angle and then be reflected at surface 1010C back into the prism.

Figure 29:
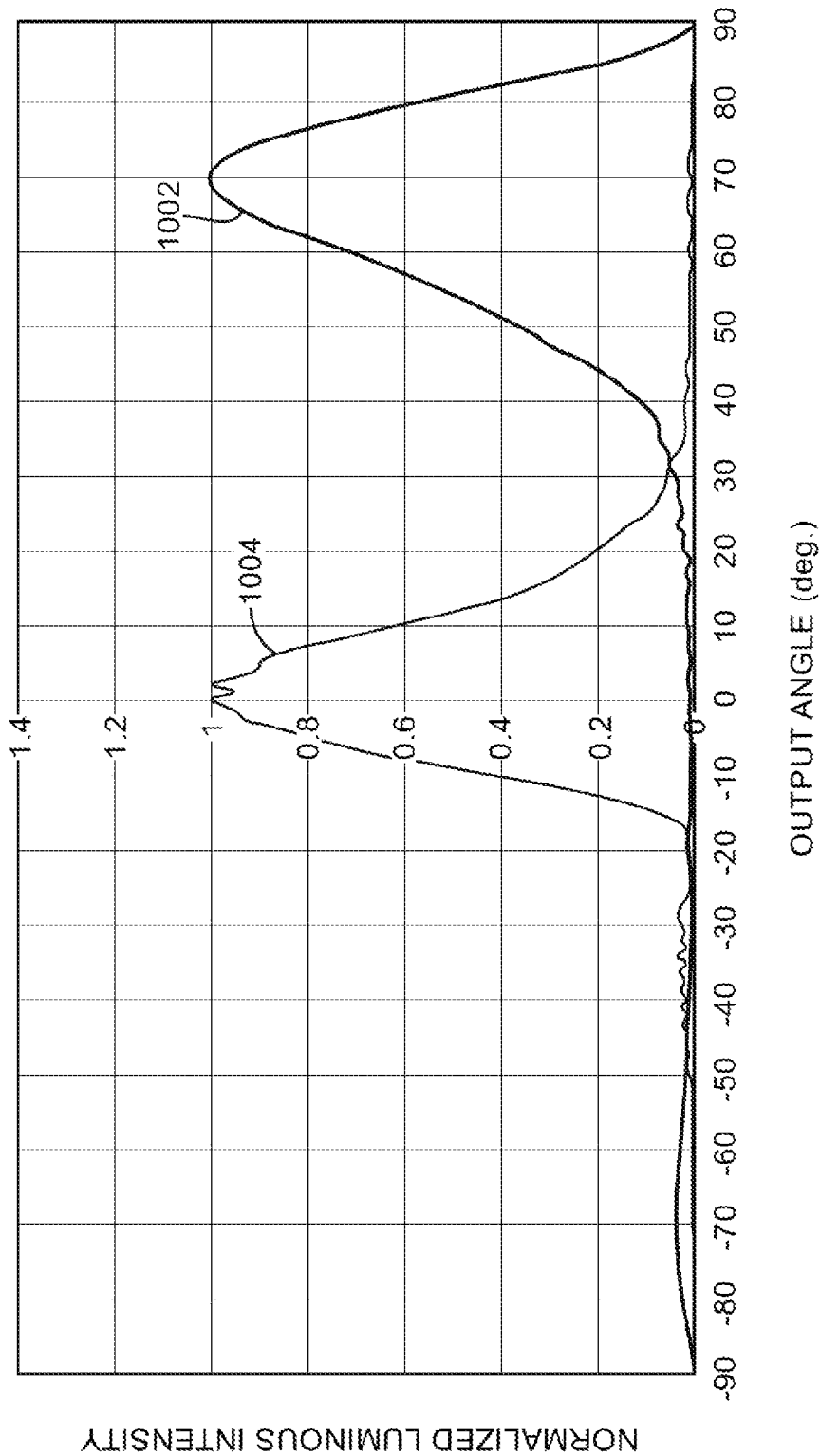
FIG. 29 is a graph showing illustrative luminance intensity output profiles from a light guide element and a face-down prism film in accordance with an embodiment of the present invention.

FIG. 29 is a graph that illustrates luminous intensity output profiles of light from a light guide element and a single face-down prism. As shown, curve 1002 represents the light output from the light guide element, while curve 1004 represents light output from the single face-down prism. The example of FIG. 29 represents light output for a face-down prism in which the prism pitch is 50 microns and the apex angle is 66 degrees.

A Brewster angle is an angle of incidence at which light with a particular polarization is transmitted without reflection. When unpolarized light is incident at the Brewster angle, the light that is reflected from the surface is completely polarized. If a prism or a light guide element is made of polymer (e.g., polymethyl methacrylate), the Brewster angle of the prism is about 34 degrees.

At the Brewster angle, no p-polarized light or p-component is reflected from the surface. The reflected light is s-polarized or s-component light. The light transmittance output from the light guide element varies with polarization direction, as shown in Equations (2) and (3) below.

In equations 2 and 3 below, Tp is the light transmittance for a polarization component parallel to the incident plane, and Ts is light transmittance for a polarization component perpendicular to the incident plane. Both Tp and Ts are dependent upon an incident angle $\theta_i$ and a refraction angle $\theta_t$ from a normal direction that is perpendicular to the light guide element.

$$Tp = \sin(2\theta_i)\sin(2\theta_t)/\sin^2(\theta_i+\theta_t)/\cos^2(\theta_i-\theta_t) \quad \text{Equation (2)}$$

$$Ts = \sin(2\theta_i)\sin(2\theta_t)/\sin^2(\theta_i+\theta_t) \quad \text{Equation (3)}$$

Figure 30:
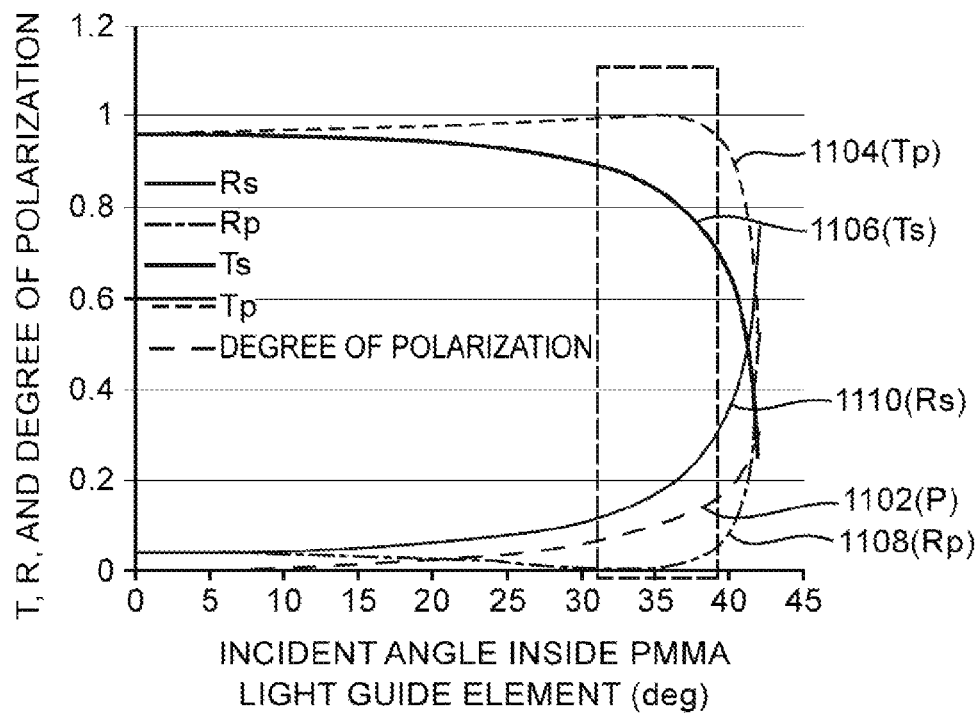
FIG. 30 is a graph showing illustrative light polarization from a light guide element in accordance with an embodiment of the present invention.

FIG. 30 illustrates light polarization from a light guide element according to embodiments of the present disclosure. As shown, the transmitted polarized light 1104(Tp) and 1106 (Ts), reflected polarized light 1110(Rs) and 1108(Rp), as well as degree of polarization 1102(P) vary with incident angles. The light output from the light guide element is partially polarized. The light guide element emission may be predominately at angles ranging from about 50 degrees to about 80 degrees from the normal direction (as examples) when the incident angle inside the light guide element ranges from 31 degrees to 40 degrees.

Figure 31:
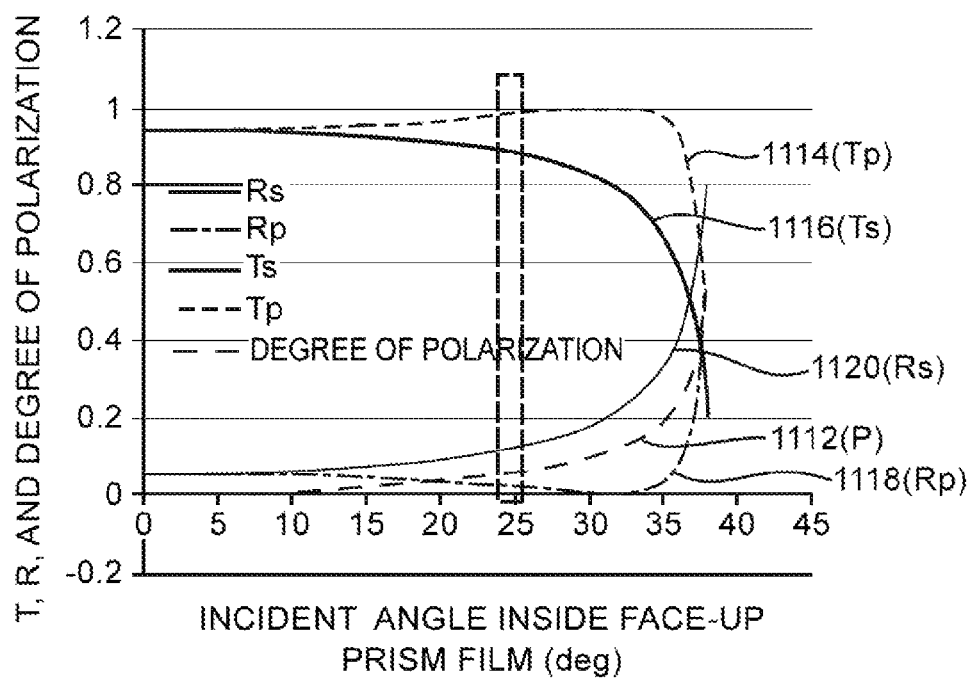
FIG. 31 is a graph showing illustrative light polarization from a face-down prism film in accordance with an embodiment of the present invention.

FIG. 31 illustrates light polarization from a face-up prism film according to embodiments of the present disclosure. As shown, the transmitted polarized light 1114(Tp) and 1116 (Ts), reflected polarized light 1118(Rp) and 1120(Rs), as well as degree of polarization 1112(P) vary with incident angles. When the incident angle inside the face-up prism film is about 25 degrees, the light comes out of the prism film nearly in a normal direction with respect to the LCD panel. As shown in FIG. 31, the light coming out of face-up prism film may also be partially polarized.

Figure 32:
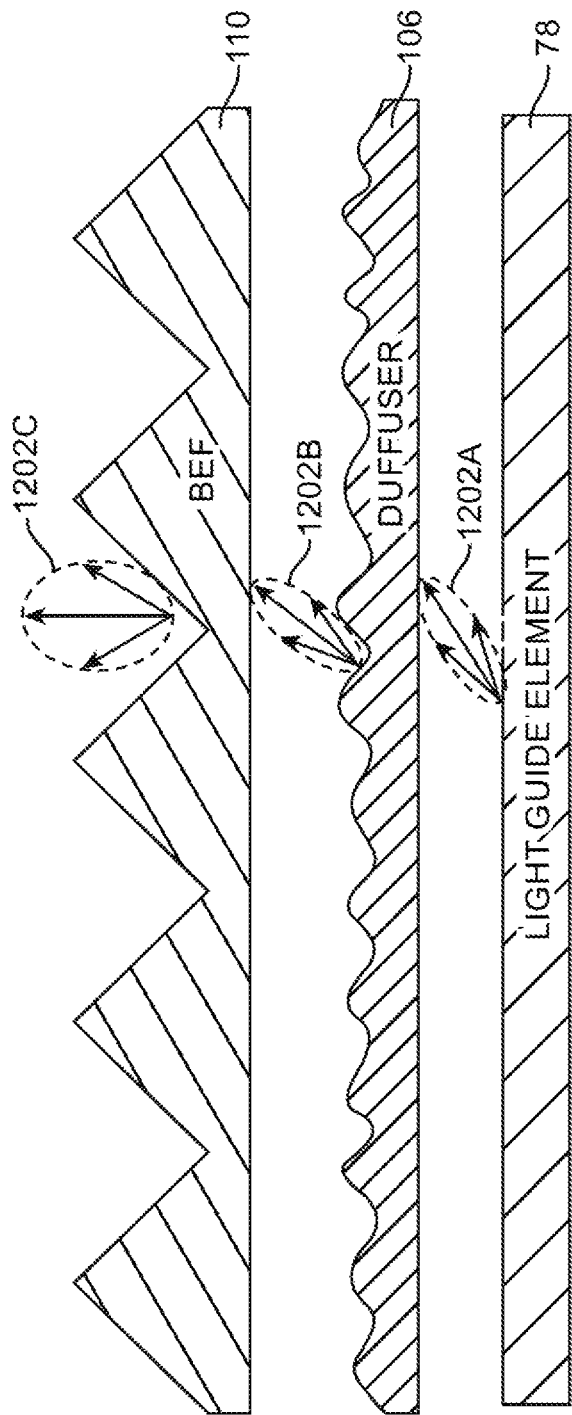
FIG. 32 is a diagram showing how light may propagate within in a light guide element, a diffuser film and a face-up prism film in accordance with an embodiment of the present invention.

FIG. 32 illustrates the light propagation in a light guide element, a diffuser film, and a face-up prism film such as face-up prism film 110 according to embodiments of the present disclosure. Light output from light guide element 78 may be angled at about 70 degrees (for example) from the normal direction to the light guide element, as shown by rays 1202A. Rays 1202A from the light guide element are collimated slightly by the diffuser film, as shown by rays 1202B. Rays 1202B are further collimated by the face-up prism film toward a normal direction to the reflective polarizer, as shown by rays 1202C.

Figure 33:
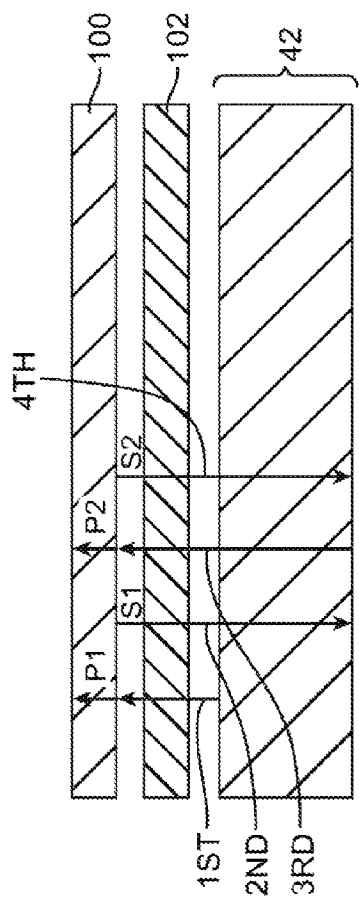
FIG. 33 is a diagram showing illustrative light recycling between a reflective polarizer, a quarter-wave film, optical films, and a backlight unit in accordance with an embodiment of the present invention.

FIG. 33 illustrates light recycling between reflective polarizer 100, quarter wave film 102, and BLU 42 (which may include some or all of optical films 70) according to embodiments of the present disclosure. As shown, $P_1$ and $P_2$ represent light components transmitting through reflective polarizer 100 for respective first and second times. Elements $s_1$ and $s_2$ represent the s-component reflected from reflective polarizer 100 and recycled by QWF 102, optical films 70 and BLU 42 for respective first time and second times.

As shown in FIG. 33, the light rays 1ST, 2ND, 3RD and 4TH represent light passing through the QWF for respective first, second, third, and fourth times. The 2ND and 3RD times in the QWF represent a round trip for one recycle.

Figure 34:
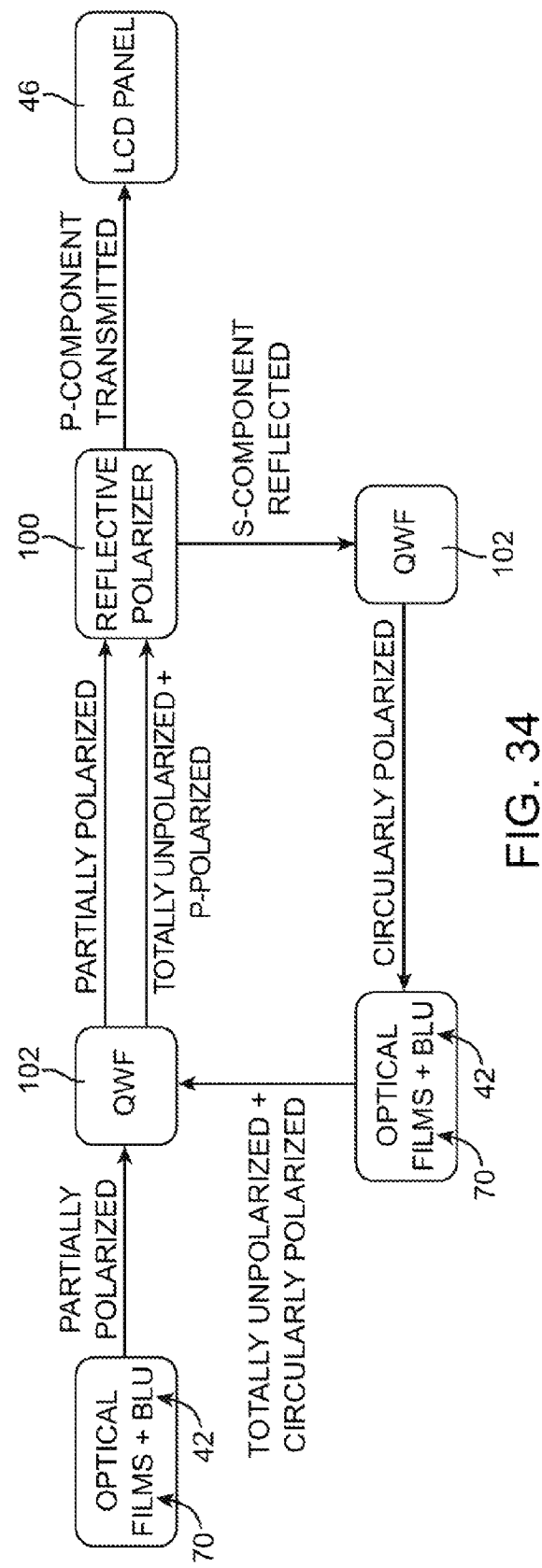
FIG. 34 is a flow diagram showing how light may be recycled through the reflective polarizer, the quarter wave film, the optical film and the backlight unit in accordance with an embodiment of the present invention.

FIG. 34 illustrates a flow process representing light that is recycled through the reflective polarizer, the quarter wave film, the optical films and the BLU according to embodiments of the present disclosure. As shown in FIG. 34, the light output from BLU 42 (and optical films 70) is partially polarized. This partially polarized light passes through QWF 102 for a first time and is still partially polarized. The partially polarized light has a p-component that passes through reflective polarizer 100 to LCD panel 46 while an s-component is reflected back from reflective polarizer 100. The reflected s-component enters QWF 102 for a second time and becomes circularly polarized. This circularly polarized light then goes through the round trip as light rays 2ND and 3RD (see FIG. 33) in one recycle in the optical films and the BLU.

The polarization of the circularly polarized light is partially depolarized and partially preserved, such that the output includes unpolarized light and circularly polarized light. The circularly polarized light enters into QWF 102 for a third time and becomes linearly polarized light that rotates about 90 degrees which is now a p-component. This p-component passes through reflective polarizer 100 and enters into LCD panel 46 to illuminate it.

The unpolarized portion of the partially polarized light from the optical films and the BLU goes through the light recycling over again. As one can see from the flow diagram of FIG. 34, the partial polarization preservation property of the optical films and BLU enable the QWF to help improve the reflective polarizer light recycling efficiency.

The total transmittance of the reflective polarizer without a QWF can be expressed by Equation (4) as follows:

$$T=0.5+0.5*r*p/[1-r*(1-p)] \quad \text{Equation (4)}$$

The total transmittance of the reflective polarizer with a QWF can be expressed by Equation (5) as follows:

$$T=0.5+0.5*r*(1-p)/(1-r*p) \quad \text{Equation (5)}$$

where r is the light reflectance from optical films and BLU during light recycling, p is the polarization conversion efficiency for the reflective polarizer, which counts the percentage of linearly polarized light being rotated 90 degrees after a round-trip in the optical films and the BLU. A brightness gain of the reflective polarizer is defined by T/0.5. Typically, a display having a reflective polarizer has a gain ranging from 1.3 to 1.35 (for example) compared to a display that does not include reflective polarizer.

Figure 35:
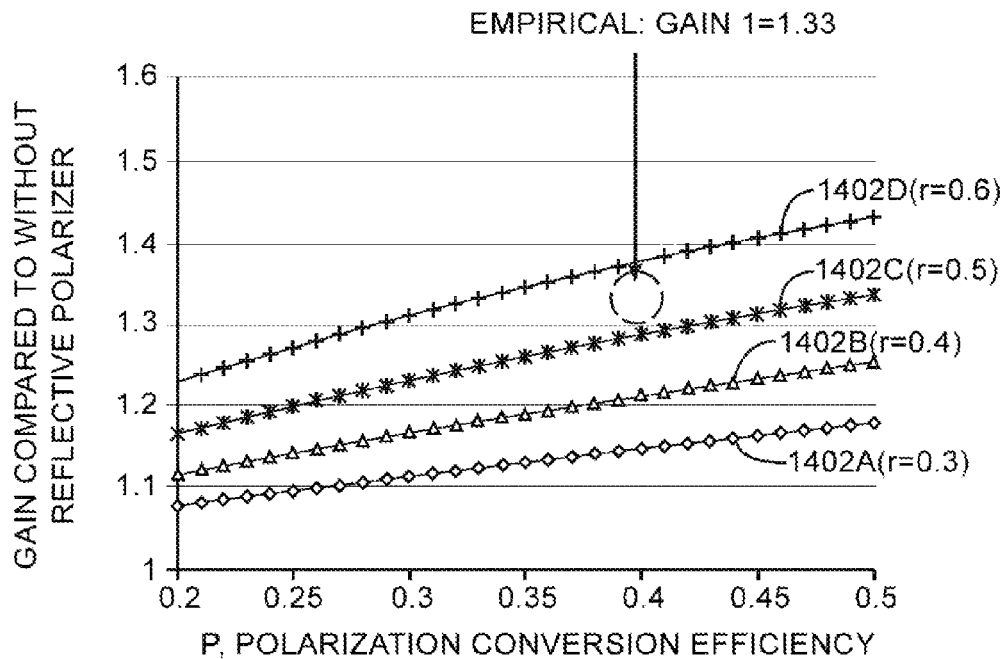
FIG. 35 is a graph showing an illustrative gain for a display having a reflective polarizer in comparison with a conventional display that does not include a reflective polarizer in accordance with an embodiment of the present invention.

Based upon Equations (4) and (5), the gain versus polarization conversion efficiency can be plotted. FIG. 35 shows an exemplary gain versus polarization conversion efficiency for a reflective polarizer without a QWF. Linear lines 1402A, 1402B, 1402C, and 1402D represent gain versus polarization conversion efficiencies for the optical films and BLU with a reflectance of r equal to 0.3, 0.4, 0.5, and 0.6, respectively. At p=0.4 and r=0.55, the empirical gain with the reflective polarizer but without the QWF is 1.33. It should be appreciated that these are sample values and may vary between embodiments.

Figure 36:
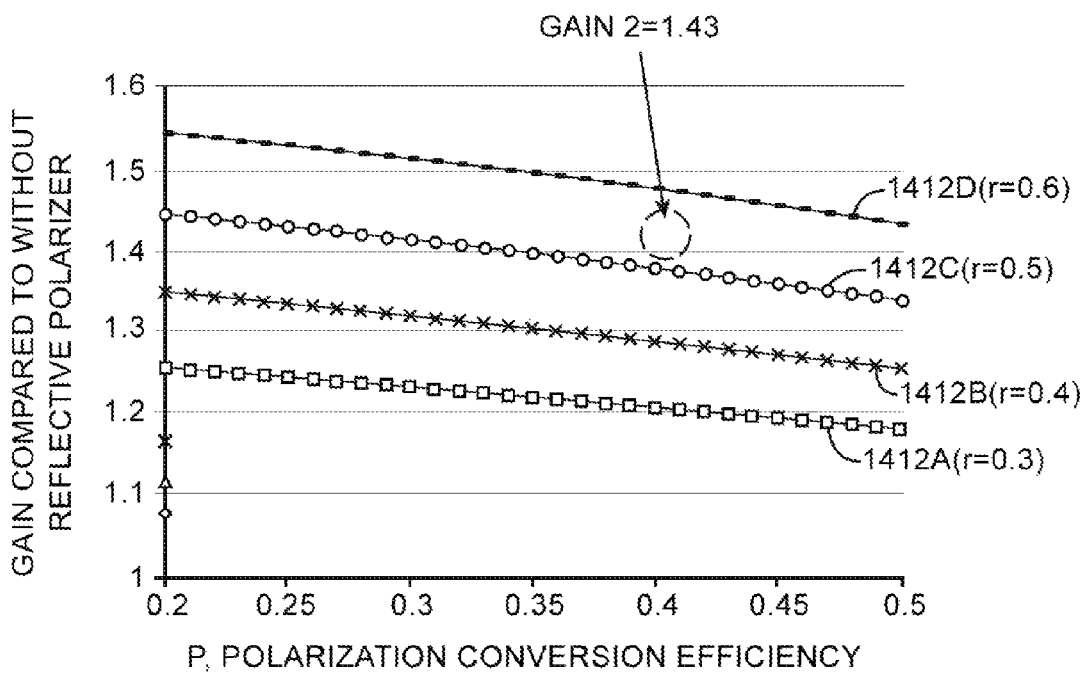
FIG. 36 is a graph showing an illustrative gain for a display having a reflective polarizer and a quarter wave film in comparison with a conventional display that does not include a reflective polarizer in accordance with an embodiment of the present invention.

FIG. 36 shows an exemplary gain versus polarization conversion efficiency for a reflective polarizer with a QWF according to embodiments of the present disclosure. Linear lines 1412A, 1412B, 1412C, and 1412D represent gain versus polarization conversion efficiencies for the optical films and BLU with a reflectance of r equal to 0.3, 0.4, 0.5, and 0.6, respectively. As shown in FIG. 36, when p is less than 0.5, the gain of the reflective polarizer with QWF is higher than that of the reflective polarizer without QWF. For example, at p=0.4 and r=0.55, the gain (GAIN 2) is 1.43 (for example) for the reflective polarizer with the QWF.

Comparing FIGS. 35 and 36, the brightness gain increases 7.5% with the QWF added to the backside of reflective polarizer. When p=0.5, the QWF may not affect the gain of the reflective polarizer, because the optical films and BLU do not preserve the polarization.

Figure 37:
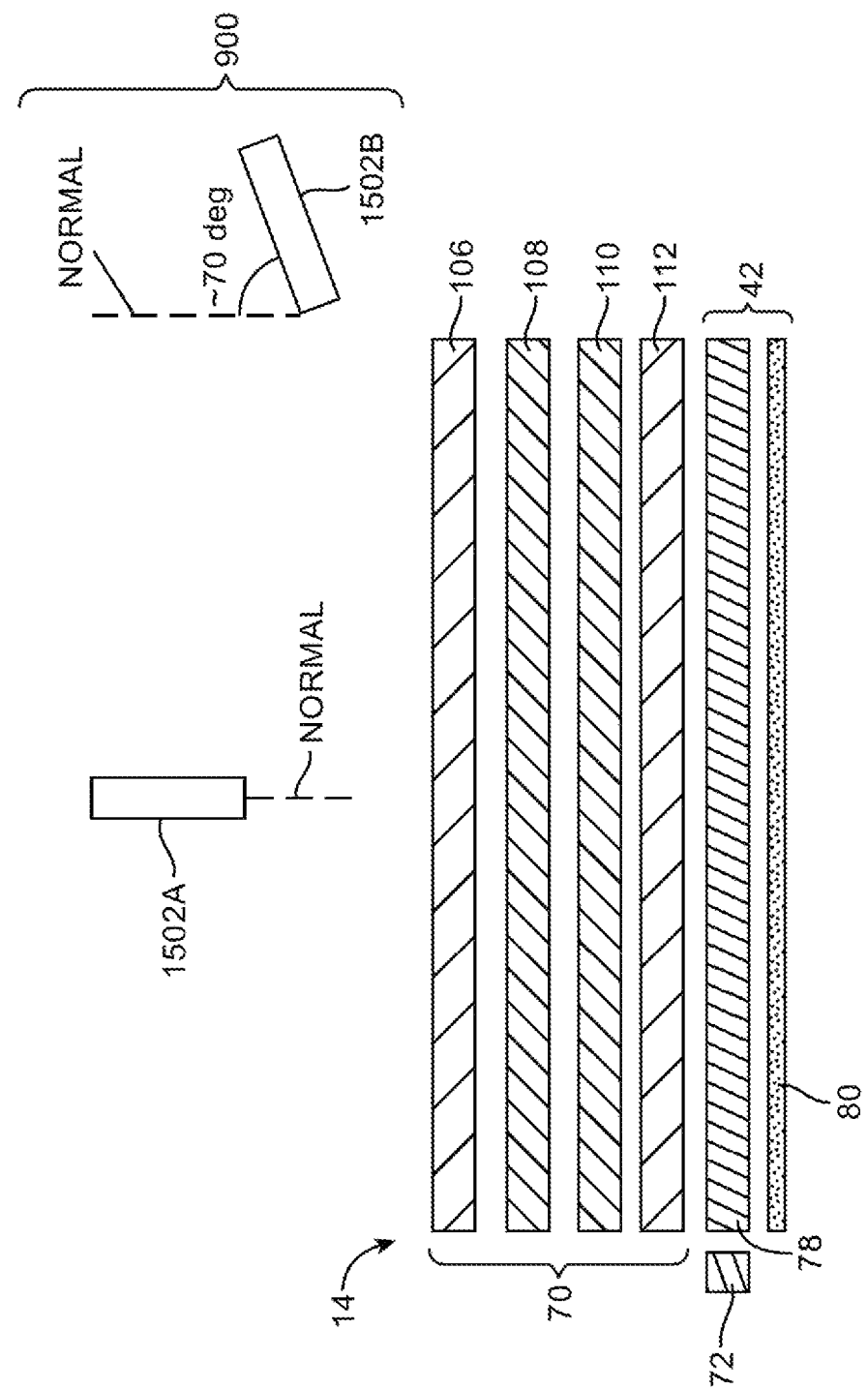
FIG. 37 is a diagram of an illustrative test system for measuring light luminance from a backlight unit at a normal direction and other angles from the normal direction in accordance with an embodiment of the present invention.

FIG. 37 illustrates a test system such as system 900 that may be used for measuring light intensity from display 14 (e.g., light that is emitted from BLU 42 and passes through optical films 70 and, if desired, a reflective polarizer and a quarter wave film) during design and/or manufacturing operations for a display such as display 14.

In the example of FIG. 37, system 900 is configured to measure light output a normal angle with respect to the surface of display 14 and an additional angle such as 70 degrees from normal. Photodetector 1502A may be configured to detect backlight generated by backlight unit 42 in the normal direction with respect to optical films 70 and BLU 42. Photodetector 1502B may be configured to detect light from light guide element 78 in absence of the optical films 70. A system of this type may allow measurements of luminance ratios between p-components and s-components in various configurations of a display such as display 14.

The foregoing is merely illustrative of the principles of this invention and various modifications can be made by those skilled in the art without departing from the scope and spirit of the invention.

What is claimed is:
1. A display, comprising:
  a liquid crystal display module having upper and lower polarizer layers;
  a backlight unit having a reflector;
  a reflective polarizer interposed between the reflector and the liquid crystal display module;
  a uniaxial quarter wave film between the reflective polarizer and the reflector;
  a uniaxial c-film adjacent to the uniaxial quarter wave film, wherein the uniaxial quarter wave film is interposed between the uniaxial c-film and the reflective polarizer; and
  an additional uniaxial c-film interposed between the reflective polarizer and the uniaxial quarter wave film.

2. The display defined in claim 1 further comprising a diffuser film and a prism film, wherein the diffuser film is interposed between the prism film and the uniaxial quarter wave film.

3. The display defined in claim 2 wherein the reflective polarizer is interposed between the uniaxial quarter wave film and the lower polarizer.

4. The display defined in claim 3 wherein the uniaxial quarter wave film is interposed between the diffuser film and the reflective polarizer.

5. The display defined in claim 4 wherein the prism film comprises prism elements that face the backlight unit.

6. The display defined in claim 1 further comprising optical films that include top and bottom diffuser films arranged on opposing sides of first and second prism films having crossed prism elements that face the liquid crystal display module.

7. The display defined in claim 6 wherein the uniaxial quarter wave film is interposed between the top diffuser film and the first prism film.

8. The display defined in claim 6 wherein the uniaxial quarter wave film is interposed between the bottom diffuser film and the second prism film.

9. The display defined in claim 6 wherein the uniaxial quarter wave film is interposed between the bottom diffuser layer and the backlight unit.

10. The display defined in claim 6 wherein the backlight unit further comprises a light guide layer and wherein the uniaxial quarter wave film is interposed between the light guide layer and the reflector.

11. The display defined in claim 1 further comprising a diffuser.

12. The display defined in claim 11 wherein the reflective polarizer separates the diffuser from the lower polarizer.

* * * * *